(12) United States Patent
Ou

(10) Patent No.: US 12,259,043 B2
(45) Date of Patent: Mar. 25, 2025

(54) SLIDING COMPONENT

(71) Applicant: Eagle Industry Co., Ltd., Tokyo (JP)

(72) Inventor: Iwa Ou, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 345 days.

(21) Appl. No.: 17/424,850

(22) PCT Filed: Jan. 31, 2020

(86) PCT No.: PCT/JP2020/003643
§ 371 (c)(1),
(2) Date: Jul. 21, 2021

(87) PCT Pub. No.: WO2020/162348
PCT Pub. Date: Aug. 13, 2020

(65) Prior Publication Data
US 2022/0120315 A1    Apr. 21, 2022

(30) Foreign Application Priority Data

Feb. 4, 2019    (JP) .................................. 2019-017872

(51) Int. Cl.
*F16J 15/34*    (2006.01)
(52) U.S. Cl.
CPC ........... *F16J 15/3412* (2013.01); *F16J 15/34* (2013.01)
(58) Field of Classification Search
CPC .............................. F16J 15/34; F16J 15/3412
See application file for complete search history.

(56) References Cited

U.S. PATENT DOCUMENTS

| 3,383,116 | A | 5/1968 | Carter ............................. 277/96 |
| 3,527,465 | A | 9/1970 | Guinard |
| 3,675,935 | A | 7/1972 | Ludwig ................. F16J 15/342 |
| 3,695,789 | A | 10/1972 | Jansson ................. F01C 21/003 |
| 3,704,019 | A | 11/1972 | McHugh ....................... 277/400 |

(Continued)

FOREIGN PATENT DOCUMENTS

| CN | 1245552 | 2/2000 | ............... F16J 15/34 |
| CN | 2460801 | 11/2001 | ............... F16J 15/40 |

(Continued)

OTHER PUBLICATIONS

A Second Office Action issued on Jul. 25, 2016 by the State Intellectual Property Office of China counterpart application No. 201380029125.0.

(Continued)

*Primary Examiner* — Eugene G Byrd
(74) *Attorney, Agent, or Firm* — HAYES SOLOWAY P.C.

(57) ABSTRACT

There is provided a sliding component that supplies a sealed fluid to a leakage side in a gap between sliding surfaces to exhibit high lubricity and has a small leakage of the sealed fluid. A sliding component that has an annular shape and is disposed in a place where relative rotation is performed in a rotary machine, includes a plurality of dynamic pressure generating mechanisms provided in a sliding surface of the sliding component, each of the dynamic pressure generating mechanisms provided with a deep groove portion that communicates with a leakage side, and a shallow groove portion that communicates with the deep groove portion and extends in a circumferential direction.

21 Claims, 16 Drawing Sheets

(56) References Cited

U.S. PATENT DOCUMENTS

| | | | | |
|---|---|---|---|---|
| 3,782,737 | A | 1/1974 | Ludwig et al. | 277/27 |
| 3,870,382 | A | 3/1975 | Reinhoudt | F16C 17/045 |
| 4,007,974 | A | 2/1977 | Huber | F16C 17/045 |
| 4,056,478 | A | 11/1977 | Capelli | C01M 5/00 |
| 4,071,253 | A | 1/1978 | Heinen et al. | 277/3 |
| 4,120,544 | A | 10/1978 | Huber | F16C 33/107 |
| 4,523,764 | A | 6/1985 | Albers et al. | 277/3 |
| 4,889,348 | A | 12/1989 | Amundson | 277/306 |
| 5,066,026 | A | 11/1991 | Heck | F16J 15/3412 |
| 5,071,141 | A | 12/1991 | Lai et al. | |
| 5,092,612 | A | 3/1992 | Victor et al. | 277/96.1 |
| 5,174,584 | A | 12/1992 | Lahrman | 277/400 |
| 5,180,173 | A | 1/1993 | Kimura et al. | |
| 5,222,743 | A | 6/1993 | Goldswain | F16J 15/3412 |
| 5,224,714 | A | 7/1993 | Kimura | 277/400 |
| 5,368,314 | A | 11/1994 | Victor | F16J 15/3412 |
| 5,447,316 | A | 9/1995 | Matsui | 277/400 |
| 5,556,111 | A | 9/1996 | Sedy | 277/400 |
| 5,558,341 | A | 9/1996 | McNickle | 277/400 |
| 5,769,604 | A | 6/1998 | Gardner et al. | 415/170.1 |
| 5,834,094 | A | 11/1998 | Etsion et al. | 428/156 |
| 5,947,481 | A | 9/1999 | Young | 277/400 |
| 5,952,080 | A | 9/1999 | Etsion et al. | 428/156 |
| 6,002,100 | A | 12/1999 | Etsion | 219/121.71 |
| 6,046,430 | A | 4/2000 | Etsion | 219/121.71 |
| 6,135,458 | A | 10/2000 | Fuse | 277/401 |
| 6,152,452 | A | 11/2000 | Wang | 277/400 |
| 6,213,473 | B1 | 4/2001 | Lebeck | |
| 6,446,976 | B1 | 9/2002 | Key et al. | F16J 15/34 |
| 6,692,006 | B2 | 2/2004 | Holder | 277/346 |
| 6,726,213 | B2 | 4/2004 | Wang | 277/400 |
| 7,258,346 | B2 | 8/2007 | Tejima | 277/399 |
| 7,377,518 | B2 | 5/2008 | Lai | 277/400 |
| 7,744,094 | B2 | 6/2010 | Yanagisawa | F16J 15/3412 |
| 7,758,051 | B2 | 7/2010 | Roberts-Haritonov | 277/401 |
| 7,931,277 | B2 | 4/2011 | Garrison | 277/399 |
| 8,100,405 | B2 | 1/2012 | Kneeland et al. | 277/355 |
| 8,342,534 | B2 | 1/2013 | Vasagar | 277/399 |
| 8,585,060 | B2 | 11/2013 | Oshii et al. | 277/401 |
| 8,757,632 | B2 | 6/2014 | Dobosz | F16J 15/3412 |
| 9,151,390 | B2 | 10/2015 | Hosoe | F16J 15/3412 |
| 9,169,931 | B2 | 10/2015 | Tokunaga | F16J 15/34 |
| 9,228,660 | B2 | 1/2016 | Hosoe | F16J 15/3412 |
| 9,347,566 | B2 * | 5/2016 | Tokunaga | F16J 15/3412 |
| 9,353,865 | B2 | 5/2016 | Lattin | F16N 21/00 |
| 9,353,867 | B2 | 5/2016 | Itadani et al. | F16J 15/3448 |
| 9,494,239 | B2 | 11/2016 | Hosoe | F16J 15/342 |
| 9,512,923 | B2 | 12/2016 | Inoue et al. | F16J 15/34 |
| 9,574,667 | B2 | 2/2017 | Takahashi et al. | F16J 15/342 |
| 9,772,037 | B2 * | 9/2017 | Itadani | F16J 15/3424 |
| 9,784,372 | B2 | 10/2017 | Iguchi | F16J 15/342 |
| 9,863,473 | B2 | 1/2018 | Hosoe et al. | F16C 33/741 |
| 9,958,010 | B2 | 5/2018 | Itadani | F16C 33/74 |
| 9,982,715 | B2 | 5/2018 | Gorges et al. | F16C 33/201 |
| 10,054,230 | B2 | 8/2018 | Katori et al. | F16J 15/3412 |
| 10,132,411 | B2 | 11/2018 | Hosoe et al. | F16J 15/164 |
| 10,337,620 | B2 | 7/2019 | Tokunaga et al. | F16J 15/342 |
| 10,443,737 | B2 | 10/2019 | Itadani | F16J 15/342 |
| 10,495,228 | B2 | 12/2019 | Itadani | F16J 15/342 |
| 10,612,666 | B2 * | 4/2020 | Tokunaga | F16J 15/36 |
| 10,823,162 | B2 | 11/2020 | Kume | F04B 27/1804 |
| 10,865,883 | B2 * | 12/2020 | Seki | F16J 15/3272 |
| 11,248,706 | B2 | 2/2022 | Imura | F16C 33/74 |
| 11,320,052 | B2 | 5/2022 | Imura et al. | F16J 15/34 |
| 11,708,911 | B2 * | 7/2023 | Imura | F16J 15/34, 277/400 |
| 2002/0014743 | A1 | 2/2002 | Zheng | 277/358 |
| 2002/0093141 | A1 | 7/2002 | Wang | F16J 15/34 |
| 2002/0109302 | A1 | 8/2002 | Muraki | F16J 15/3412 |
| 2002/0158416 | A1 | 10/2002 | Hosanna | F16J 15/3404 |
| 2004/0080112 | A1 | 4/2004 | Tejima | F16J 15/3436 |
| 2005/0212217 | A1 | 9/2005 | Tejima | 277/399 |
| 2005/0263963 | A1 | 12/2005 | Lai | 277/399 |
| 2007/0228664 | A1 | 10/2007 | Anand | F16J 15/3496 |
| 2007/0267820 | A1 | 11/2007 | Martin | F16J 15/3496 |
| 2007/0275267 | A1 | 11/2007 | Sabouni | F16J 15/3496 |
| 2007/0296156 | A1 | 12/2007 | Yanagisawa et al. | 277/352 |
| 2008/0100001 | A1 | 5/2008 | Flaherty | |
| 2009/0200749 | A1 | 8/2009 | Teshima | F16J 15/3484 |
| 2011/0215531 | A1 | 9/2011 | Tokunaga et al. | 277/399 |
| 2011/0215535 | A1 | 9/2011 | Vasagar | 277/559 |
| 2011/0305871 | A1 | 12/2011 | Tabuchi | F16J 15/3284 |
| 2012/0018957 | A1 * | 1/2012 | Watanabe | F16J 15/441, 277/387 |
| 2012/0217705 | A1 | 8/2012 | Hosoe | 277/400 |
| 2013/0168928 | A1 | 7/2013 | Schrufer | C10M 103/02 |
| 2013/0209011 | A1 | 8/2013 | Tokunaga | |
| 2014/0159314 | A1 | 6/2014 | Hosoe | F16J 15/34 |
| 2014/0197600 | A1 | 7/2014 | Hosoe | F16J 15/342 |
| 2014/0203517 | A1 | 7/2014 | Ferris | F16J 15/3412 |
| 2014/0217676 | A1 | 8/2014 | Hosoe et al. | 277/350 |
| 2014/0319776 | A1 | 10/2014 | Theike et al. | |
| 2015/0115537 | A1 | 4/2015 | Tokunaga | F16J 15/3412 |
| 2015/0115540 | A1 | 4/2015 | Tokunaga | F16J 15/34 |
| 2015/0123350 | A1 * | 5/2015 | Itadani | F16J 15/3412, 277/400 |
| 2015/0167847 | A1 | 6/2015 | Tokunaga | |
| 2015/0345642 | A1 | 12/2015 | Haas | F16J 15/3496 |
| 2015/0377297 | A1 | 12/2015 | Tokunaga et al. | F16C 33/748 |
| 2016/0033045 | A1 | 2/2016 | Itadani et al. | F16J 15/3412 |
| 2016/0097457 | A1 | 4/2016 | Sun et al. | F16J 15/3412 |
| 2017/0175726 | A1 | 6/2017 | Kume | F04B 27/1804 |
| 2017/0241549 | A1 | 8/2017 | Itadani | F16J 15/3412 |
| 2017/0261107 | A1 | 9/2017 | Martin | F16J 15/3452 |
| 2017/0350407 | A1 | 12/2017 | Yamamoto et al. | F04D 29/046 |
| 2018/0017163 | A1 | 1/2018 | Hosoe et al. | F16J 15/164 |
| 2018/0051809 | A1 | 2/2018 | Yoshida | F16J 15/3412 |
| 2018/0073394 | A1 * | 3/2018 | Tokunaga | F16J 15/3412 |
| 2018/0112711 | A1 | 4/2018 | Itadani | F16J 15/363 |
| 2018/0128377 | A1 | 5/2018 | Tukunaga et al. | F16J 15/342 |
| 2018/0128378 | A1 | 5/2018 | Tokunaga et al. | F16J 15/342 |
| 2018/0135699 | A1 | 5/2018 | Tokunaga et al. | F16C 33/80 |
| 2018/0172162 | A1 | 6/2018 | Tokunaga et al. | F16J 15/34 |
| 2018/0195618 | A1 | 7/2018 | Itadani et al. | F16J 15/3416 |
| 2018/0299015 | A1 | 10/2018 | Itadani | F16J 15/3448 |
| 2019/0170257 | A1 | 6/2019 | Hosoe et al. | F16J 15/3412 |
| 2019/0285115 | A1 | 9/2019 | Negishi et al. | F16C 17/045 |
| 2019/0301522 | A1 | 10/2019 | Negishi et al. | F16C 17/02 |
| 2019/0331162 | A1 | 10/2019 | Negishi | F16J 15/34 |
| 2020/0224768 | A1 | 7/2020 | Imura | F16J 15/3412 |
| 2020/0240470 | A1 | 7/2020 | Sorgenti | F16J 15/3212 |
| 2020/0332901 | A1 | 10/2020 | Imura | F16J 15/3412 |
| 2021/0041026 | A1 | 2/2021 | Imura | F16J 15/3424 |
| 2021/0048062 | A1 | 2/2021 | Masumi et al. | F16C 17/102 |
| 2021/0048106 | A1 | 2/2021 | Imura et al. | F16J 15/3412 |
| 2021/0080009 | A1 | 3/2021 | Kimura et al. | F16J 15/3412 |
| 2021/0116030 | A1 | 4/2021 | Kimura et al. | F16J 15/182 |
| 2021/0364034 | A1 | 11/2021 | Okada | F16J 15/342 |

FOREIGN PATENT DOCUMENTS

| | | | | |
|---|---|---|---|---|
| CN | 1401924 | 3/2003 | | F16J 15/16 |
| CN | 101644333 | 2/2010 | | F16J 15/34 |
| CN | 201496542 | 6/2010 | | F16J 15/16 |
| CN | 101793169 | 8/2010 | | F01D 11/08 |
| CN | 101793324 | 8/2010 | | F16J 15/16 |
| CN | 101861485 | 10/2010 | | F16J 15/34 |
| CN | 203098871 | 7/2013 | | F16J 15/34 |
| CN | 103557229 | 2/2014 | | F16C 17/04 |
| CN | 103557334 | 2/2014 | | F16J 15/34 |
| CN | 203641506 | 6/2014 | | F16J 15/16 |
| CN | 104169622 | 11/2014 | | F16J 15/34 |
| CN | 104321568 | 1/2015 | | F16C 33/72 |
| CN | 104685273 | 6/2015 | | F16J 15/34 |
| CN | 105014489 | 11/2015 | | B24B 19/02 |
| CN | 106029294 | 10/2016 | | B23K 26/364 |
| CN | 205877184 | 1/2017 | | F16J 15/16 |
| CN | 205877198 | 1/2017 | | F16J 15/34 |
| CN | 106439023 | 2/2017 | | F16J 15/16 |
| CN | 106763778 | 5/2017 | | F16J 15/16 |
| CN | 107489770 | 12/2017 | | F16J 15/34 |
| CN | 107906206 | 4/2018 | | F16J 15/34 |
| CN | 109237042 | 1/2019 | | F16J 15/34 |
| CN | 110770456 | 2/2020 | | F16C 33/12 |

(56) References Cited

FOREIGN PATENT DOCUMENTS

| | | | |
|---|---|---|---|
| CN | 111656065 | 9/2020 | ............... F16J 15/34 |
| DE | 3223703 | 6/1982 | ............... F16J 15/34 |
| DE | 102008038396 | 2/2010 | |
| EP | 0369295 | 11/1988 | ............... F16J 15/34 |
| EP | 0518681 | 12/1992 | ............. G11B 15/60 |
| EP | 0637706 | 8/1993 | ............... F16J 15/34 |
| EP | 2138225 | 12/2009 | ............... B01J 13/20 |
| EP | 2754931 | 7/2014 | ............... F16J 15/34 |
| EP | 3112078 | 1/2017 | ........... B23K 26/364 |
| EP | 3196516 | 7/2017 | ............... F16J 15/34 |
| EP | 3217049 | 9/2017 | ............... F16J 15/34 |
| EP | 3396186 | 10/2018 | ............... F16C 33/10 |
| EP | 33396185 | 10/2018 | ............... F16C 27/04 |
| EP | 3575621 | 12/2019 | ............... F16C 13/10 |
| EP | 3575643 | 12/2019 | ............... F16J 15/34 |
| EP | 3650722 | 5/2020 | ............... F16C 33/12 |
| FR | 2342440 | 9/1997 | ............... F16J 15/34 |
| GB | 1509482 | 5/1978 | ............... F16C 33/10 |
| GB | 2263952 | 8/1993 | ............... F16J 15/34 |
| JP | S51-034974 | 3/1976 | |
| JP | S52-143571 | 10/1977 | ............... F16J 15/26 |
| JP | 57163770 | 10/1982 | ........... F16J 15/3412 |
| JP | S59-195253 | 12/1984 | ............... F16J 15/34 |
| JP | S59-195254 | 12/1984 | ............... F16J 15/34 |
| JP | S63-190975 | 8/1988 | ............... F16J 15/34 |
| JP | H02-236067 | 9/1990 | ............... F16J 15/34 |
| JP | H02-136863 | 11/1990 | ............... F16J 15/34 |
| JP | H04-50559 | 2/1992 | ............... F16J 15/34 |
| JP | H04-337165 | 11/1992 | ............... F16J 15/34 |
| JP | H05-60247 | 3/1993 | ............... F16J 15/34 |
| JP | H05-296248 | 11/1993 | |
| JP | H05-90049 | 12/1993 | ............... F16J 15/34 |
| JP | H06-17941 | 1/1994 | ............... F16J 15/34 |
| JP | H06-117547 | 4/1994 | ............... F16J 15/34 |
| JP | H06-174107 | 6/1994 | ............... F16J 15/34 |
| JP | H06-323442 | 11/1994 | ............... F16J 15/34 |
| JP | H06-105105 | 12/1994 | ............... F16J 15/34 |
| JP | 9-89119 | 3/1997 | ............... F16J 15/34 |
| JP | 9-292034 | 11/1997 | ............... F16J 15/34 |
| JP | H10-281299 | 10/1998 | ............... F16J 15/34 |
| JP | H10-292867 | 11/1998 | |
| JP | H11-287329 | 10/1999 | ............... F16J 15/34 |
| JP | 3066367 | 5/2000 | ............... F16J 15/34 |
| JP | 2001-12458 | 1/2001 | ............... F16C 17/10 |
| JP | 2003-343730 | 12/2003 | ............... F16J 15/22 |
| JP | 2005-180652 | 7/2005 | ............... F16J 15/34 |
| JP | 2005-315391 | 11/2005 | |
| JP | 2005-337503 | 12/2005 | ............... F16J 15/34 |
| JP | 2006-77899 | 3/2006 | ............... F16J 15/34 |
| JP | 2006-90524 | 4/2006 | ............... F16C 17/02 |
| JP | 2006-183702 | 7/2006 | ............... F16C 17/04 |
| JP | 2007-162045 | 6/2007 | |
| JP | 2008-106940 | 5/2008 | ............... F16J 15/34 |
| JP | 2011-74931 | 4/2011 | ............... F16J 15/34 |
| JP | 2011-185292 | 9/2011 | ............... F16J 15/34 |
| JP | 2012-2295 | 1/2012 | ............... F16J 15/34 |
| JP | 2012-062534 | 3/2012 | |
| JP | 2012-122135 | 6/2012 | ............... C25D 15/02 |
| JP | 2013-213545 | 10/2013 | ............... F16C 32/06 |
| JP | 2014-529052 | 10/2014 | |
| JP | 2015-063647 | 4/2015 | |
| JP | 2015-68330 | 4/2015 | ............... F04C 29/00 |
| JP | 5693599 | 4/2015 | |
| JP | 2016-80090 | 5/2016 | ............... F16J 15/34 |
| JP | 5960145 | 7/2016 | ............... F16J 15/34 |
| KR | 10-2017-0093349 | 8/2017 | ............... F04B 53/10 |
| WO | WO 2006/051702 | 5/2006 | ............... F16J 15/34 |
| WO | WO 2011/115073 | 9/2011 | ............... F16J 15/34 |
| WO | WO 2012/046749 | 4/2012 | ............... F16J 15/34 |
| WO | WO 2013/035503 | 3/2013 | ............... F16J 15/34 |
| WO | WO2013053411 | 4/2013 | |
| WO | WO2014061544 | 4/2014 | |
| WO | WO2014148316 | 9/2014 | ............... F16J 15/34 |
| WO | WO2014148317 | 9/2014 | ............... F16J 15/34 |
| WO | WO 2014/174725 | 10/2014 | ............... F16J 15/34 |
| WO | WO2015111707 | 7/2015 | ............... F16J 15/18 |
| WO | WO2016035860 | 3/2016 | ............... F16J 15/34 |
| WO | WO 2016/167262 | 10/2016 | ............... F16J 15/34 |
| WO | WO 2016/186015 | 11/2016 | ............... F16J 15/34 |
| WO | WO 2016/186019 | 11/2016 | ............... F16J 15/34 |
| WO | WO 2016/186020 | 11/2016 | ............... F16J 15/34 |
| WO | WO 2016/203878 | 12/2016 | ............... F16J 15/34 |
| WO | WO 2017/002774 | 1/2017 | ............... F16J 15/34 |
| WO | WO 2017/061406 | 4/2017 | ............... F16J 15/34 |
| WO | WO 2018/092742 | 5/2018 | ............... F16J 15/34 |
| WO | WO 2018/105505 | 6/2018 | ............... F16J 33/12 |
| WO | WO2018/139231 | 8/2018 | ............... F16J 15/34 |

OTHER PUBLICATIONS

First Notification of Reason for Refusal with Search Report dated Sep. 25, 2015 by the State Intellectual Property Office of China for Chinese counterpart application No. 201380029125.0.

First Notification of Reason for Refusal with Search Report issued by the State Intellectual Property Office of China dated Aug. 24, 2015 for Chinese counterpart application No. 201380024836.9.

First Notification of Reason for Refusal with Search Report issued by the State Intellectual Property Office of China dated Aug. 26, 2015 for Chinese counterpart application No. 201380009242.0.

Second Notification of Reason for Refusal with issued by the State Intellectual Property Office of China dated Feb. 5, 2016 for Chinese counterpart application No. 201380024836.9.

First Office Action issued in Chinese Patent Appln. Serial No. 201980007372.8, dated Sep. 27, 2021, with English translation, 13 pages.

First Office Action issued in Chinese Patent Appln. Serial No. 201980010219.0, dated Nov. 30, 2021, with English translation, 13 pages.

International Preliminary Report on Patentability and Written Opinion issued in PCT/JP2013/070713, dated Feb. 10, 2015.

International Search Report (ISR) mailed Oct. 29, 2013, issued for International application No. PCT/JP2013/070713.

International Search Report and Written Opinion issued in PCT/JP2013/070714, dated Oct. 29, 2013, with English translation, 14 pages.

International Preliminary Report on Patentability issued in PCT/JP2013/070714, dated Feb. 10, 2015.

International Search Report and Written Opinion issued in PCT/JP2019/003381, with English translation, dated Apr. 2, 2019, 20 pages.

International Preliminary Report on Patentability issued in PCT/JP2019/003381, with English translation, dated Aug. 4, 2020, 12 pages.

International Search Report and Written Opinion issued in PCT/JP2019/000617, dated Apr. 10, 2019, with English translation, 21 pages.

International Preliminary Report on Patentability issued in PCT/JP2019/000617, dated Jul. 14, 2020, with English translation, 13 pages.

International Search Report and Written Opinion issued in PCT/JP2020/003645, dated Mar. 24, 2020, with English translation, 21 pages.

International Preliminary Report on Patentability issued in PCT/JP2020/003645, dated Aug. 10, 2021, with English translation, 11pages.

International Search Report and Written Opinion issued in PCT/JP2020/003641, dated Mar. 31, 2020, with English translation, 13 pages.

International Preliminary Report on Patentability issued in PCT/JP2020/003641, dated Aug. 10, 2021, with English translation, 7 pages.

International Search Report and Written Opinion issued in PCT/JP2020/003643, dated Mar. 17, 2020, with English translation, 17 pages.

International Preliminary Report on Patentability issued in PCT/JP2020/003643, dated Aug. 10, 2021, with English translation, 10 pages.

(56) References Cited

OTHER PUBLICATIONS

International Search Report and Written Opinion issued in PCT/JP2020/003648, dated Mar. 10, 2020, with English translation, 13 pages.
International Preliminary Report on Patentability issued in PCT/JP2020/003648, dated Aug. 10, 2021, with English translation, 7 pages.
International Search Report and Written Opinion issued in PCT/JP2020/003647, dated Mar. 24, 2020, with English translation, 14 pages.
International Preliminary Report on Patentability issued in PCT/JP2020/003647, dated Aug. 10, 2021, with English translation, 8 pages.
International Search Report and Written Opinion issued in PCT/JP2020/011926, dated Apr. 28, 2020, with English translation, 12 pages.
International Preliminary Report on Patentability issued in PCT/JP2020/011926, dated Sep. 28, 2021, 4 pages.
Korean Official Action issued in related Korean Patent Application Serial No. 10-2020-7019822, dated Oct. 26, 2021 with English translation (4 pages).
European Search Report issued in related European Patent Application Serial No. 19738181.7, dated Sep. 13, 2021 (10 pages).
European Search Report issued in related European Patent Application Serial No. 19748058.5, dated Oct. 8, 2021 (9 pages).
Office Action issued in U.S. Appl. No. 16/964,943, dated Oct. 4, 2021, 19 pages.
International Search Report and Written Opinion and International Preliminary Report on Patentability issued in PCT/JP2017/040830, dated Jan. 30, 2018, with English translations, 15 pages.
European Search Report issued in related European Patent Application Serial No. 20777157.7, dated Oct. 28, 2022 (7 pages).
European Search Report issued in related European Patent Application Serial No. 20752626.0, dated Oct. 4, 2022 (7 pages).
European Search Report issued in related European Patent Application Serial No. 20753172.4, dated Oct. 4, 2022 (7 pages).
Notice of Allowance issued in U.S. Appl. No. 16/959,105, dated Nov. 3, 2022, 9 pages.
Notice of Allowance issued in U.S. Appl. No. 17/690,911, dated Nov. 25, 2022, 11 pages.
Chinese Official Action issued in related Chinese Patent Application Serial No. 201980007372.8, dated Nov. 15, 2022 with translation, 7 pages.
Chinese Official Action issued in related Chinese Patent Application Serial No. 202080010661.6, dated Nov. 30, 2022 with translation, 15 pages.
Second Office Action issued in Chinese Patent Appln. Serial No. 201980007372.8, dated May 26, 2022, with English translation, 13 pages.
First Office Action issued in Chinese Patent Appln. Serial No. 202080010586.3, dated Aug. 8, 2022, with English translation, 15 pages.
First Office Action issued in Chinese Patent Appln. Serial No. 202080010580.6, dated Aug. 2, 2022, with English translation, 12 pages.
First Office Action issued in Chinese Patent Appln. Serial No. 202080010628.3, dated Aug. 2, 2022, with English translation, 15 pages.
First Office Action issued in Chinese Patent Appln. Serial No. 202080010661.6, dated Jul. 19, 2022, with English translation, 15 pages.
First Office Action issued in Chinese Patent Appln. Serial No. 202080011045.2, dated Jul. 18, 2022, with English translation, 10 pages.
First Office Action issued in Chinese Patent Appln. Serial No. 202080018532.1, dated Aug. 24, 2022, with English translation, 14 pages.
European Search Report issued in related European Patent Application Serial No. 20752802.7, dated Oct. 11, 2022 (7 pages).
European Search Report issued in related European Patent Application Serial No. 20752708, dated Oct. 4, 2022 (7 pages).
European Search Report issued in related European Patent Application Serial No. 20752625, dated Oct. 4, 2022 (10 pages).
European Search Report issued in related European Patent Application Serial No. 20752802, dated Oct. 11, 2022 (7 pages).
European Search Report issued in related European Patent Application Serial No. 20752709, dated Oct. 11, 2022 (9 pages).
Office Action issued in U.S. Appl. No. 16/959,105, dated Mar. 25, 2022, 39 pages.
Notice of Allowance issued in U.S. Appl. No. 16/322,811, dated Apr. 19, 2022, 11 pages.
Notice of Allowance issued in U.S. Appl. No. 16/964,943, dated Jan. 11, 2022, 8 pages.
Korean Official Action issued in related Korean Patent Application Serial No. 10-2020-7022307, dated Nov. 26, 2021 with translation, 13 pages.
Official Action issued in European Patent Application Serial No. 17841422.3, dated Feb. 15, 2022, 5 pages.
Chinese Official Action issued in related Chinese Patent Application Serial No. 201980010219.0, dated Apr. 18, 2022 with translation, 17 pages.
Chinese Official Action issued in related Chinese Patent Application Serial No. 202080010586.3, dated Jan. 12, 2023 with translation, 11 pages.
Chinese Official Action issued in related Chinese Patent Application Serial No. 202080010628.3, dated Feb. 21, 2023 with translation, 14 pages.
Korean Official Action issued in related Korean Patent Application Serial No. 10-2021-7025489, dated Dec. 14, 2022 with translation, 23 pages.
Korean Official Action issued in related Korean Patent Application Serial No. 10-2021-7025490, dated Dec. 14, 2022 with translation, 10 pages.
Korean Official Action issued in related Korean Patent Application Serial No. 10-2021-7025491, dated Dec. 15, 2022 with translation, 12 pages.
Official Action issued in related U.S. Appl. No. 17/424,847, dated Feb. 2, 2023, 6 pages.
Chinese Official Action issued in related Chinese Patent Application Serial No. 202080018532.1, dated Feb. 17, 2023 with translation, 7 pages.
Chinese Official Action issued in related Chinese Patent Application Serial No. 202080010580.6, dated Mar. 17, 2023 with translation, 12 pages.
Chinese Official Action issued in related Chinese Patent Application Serial No. 202080011045.2, dated Jul. 14, 2023 with translation, 10 pages.
European Official Action issued in related European Patent Application Serial No. 19748058.5, dated Mar. 17, 2023 (5 pages).
Second Office Action issued in Chinese Patent Appln. Serial No. 202080011045.2, dated Apr. 20, 2023, with English translation, 10 pages.
Office Action issued in U.S. Appl. No. 17/425,281, dated May 12, 2023, 10 pages.
Office Action issued in U.S. Appl. No. 17/433,561, dated Jul. 13, 2023, 10 pages.
Korean Official Action issued in related Korean Patent Application Serial No. 10-2021-7025489, dated Jun. 13, 2023 with translation, 12 pages.
Korean Official Action issued in related Korean Patent Application Serial No. 10-2021-7005133, dated Apr. 20, 2023 with translation, 9 pages.
Korean Official Action issued in related Korean Patent Application Serial No. 10-2021-7025490, dated Jun. 13, 2023 with translation, 11 pages.
Korean Official Action issued in related Korean Patent Application Serial No. 10-2021-7025877, dated Jun. 1, 2023 with translation, 11 pages.
Korean Official Action issued in related Korean Patent Application Serial No. 10-2021-7025876, dated May 25, 2023 with translation, 9 pages.

(56) References Cited

OTHER PUBLICATIONS

Official Action issued in related U.S. Appl. No. 16/969,175, dated Aug. 1, 2023, 6 pages.
Chinese Official Action issued in related Chinese Patent Application Serial No. 202080010580.6, dated Aug. 31, 2023 with translation, 10 pages.
Chinese Official Action issued in related Chinese Patent Application Serial No. 202080011045.2, dated Oct. 23, 2023 with translation, 8 pages.
European Official Action issued in related European Patent Application Serial No. 23191029.0, dated Oct. 10, 2023 (9 pages).
Korean Official Action issued in related Korean Patent Application Serial No. 10-2021-7005133, dated Oct. 17, 2023 with translation, 11 pages.
Official Action issued in related U.S. Appl. No. 17/425,277, dated Sep. 21, 2023, 10 pages.
Official Action issued in related U.S. Appl. No. 17/425,678, dated Oct. 3, 2023, 8 pages.
Official Action issued in related U.S. Appl. No. 17/433,561, dated Oct. 27, 2023, 15 pages.
Office Action issued in U.S. Appl. No. 17/425,277, dated Mar. 13, 2023, 13 pages.
Office Action issued in U.S. Appl. No. 17/433,561, dated Mar. 27, 2023, 8 pages.
Chinese Official Action issued in related Chinese Patent Application Serial No. 202080010580.6, dated Nov. 28, 2023 with translation, 13 pages.
Office Action issued in U.S. Appl. No. 17/425,678, dated Apr. 25, 2024, 11 pages.
European Search Report issued in related European Application No. 24157823 .6, dated Jun. 13, 2024, 6 pages.
Official Action issued in related U.S. Appl. No. 17/433,561, dated Jun. 14, 2024, 9 pages.
Official Action issued in related U.S. Appl. No. 17/425,277, dated May 31, 2024, 14 pages.
Official Action issued in related U.S. Appl. No. 17/433,561, dated Sep. 18, 2024, 12 pages.
Notice of Allowance issued in U.S. Appl. No. 17/425,277, dated Sep. 25, 2024, 11 pages.
Office Action issued in U.S. Appl. No. 17/425,678, dated Sep. 18, 2024, 11 pages.

\* cited by examiner

Fig. 5 (a)
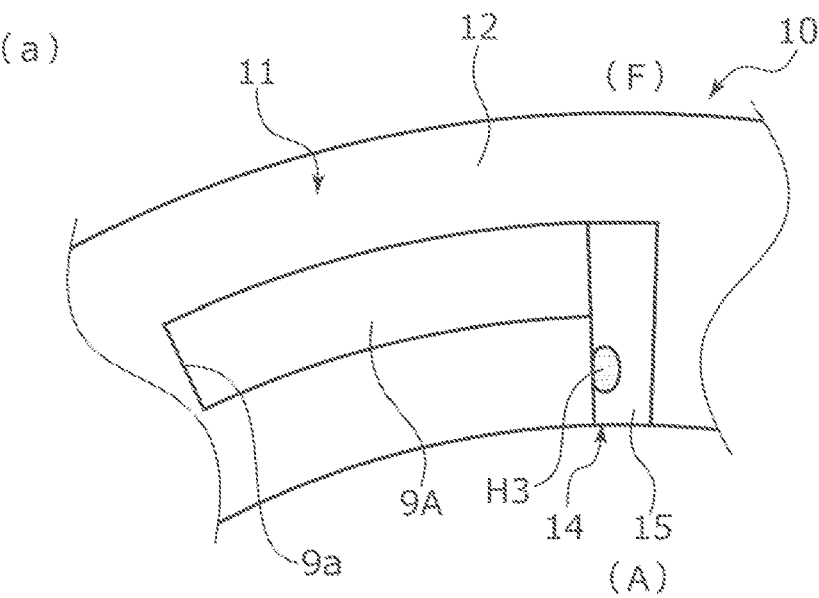
(b)
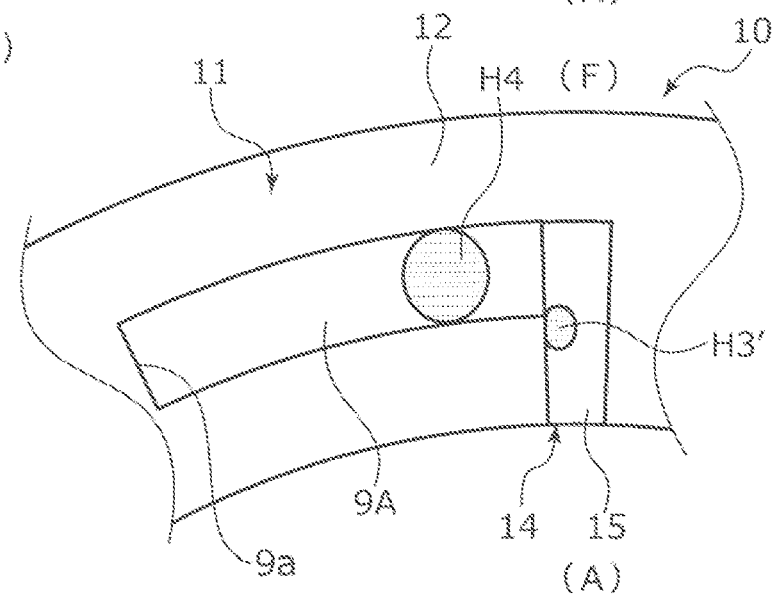
(c)
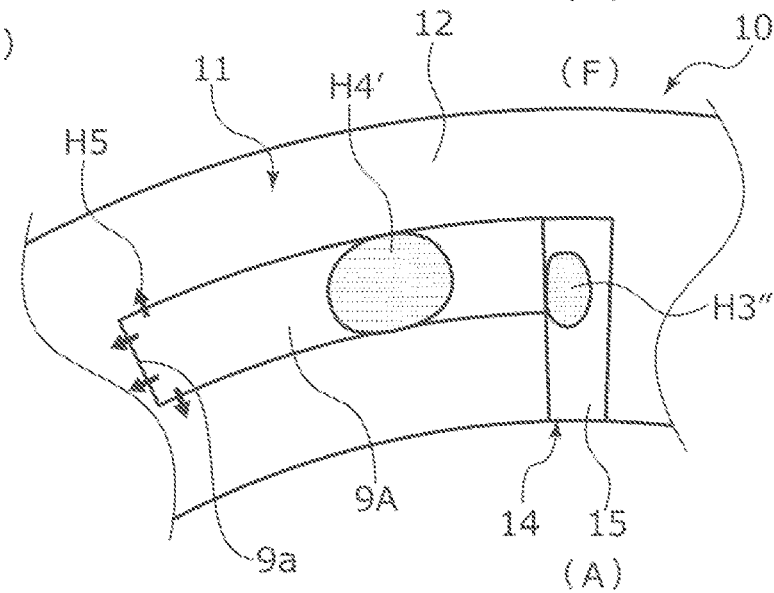

Fig. 7 ROTATIONAL DIRECTION OF ROTATING SEAL RING

Fig. 8 (a)
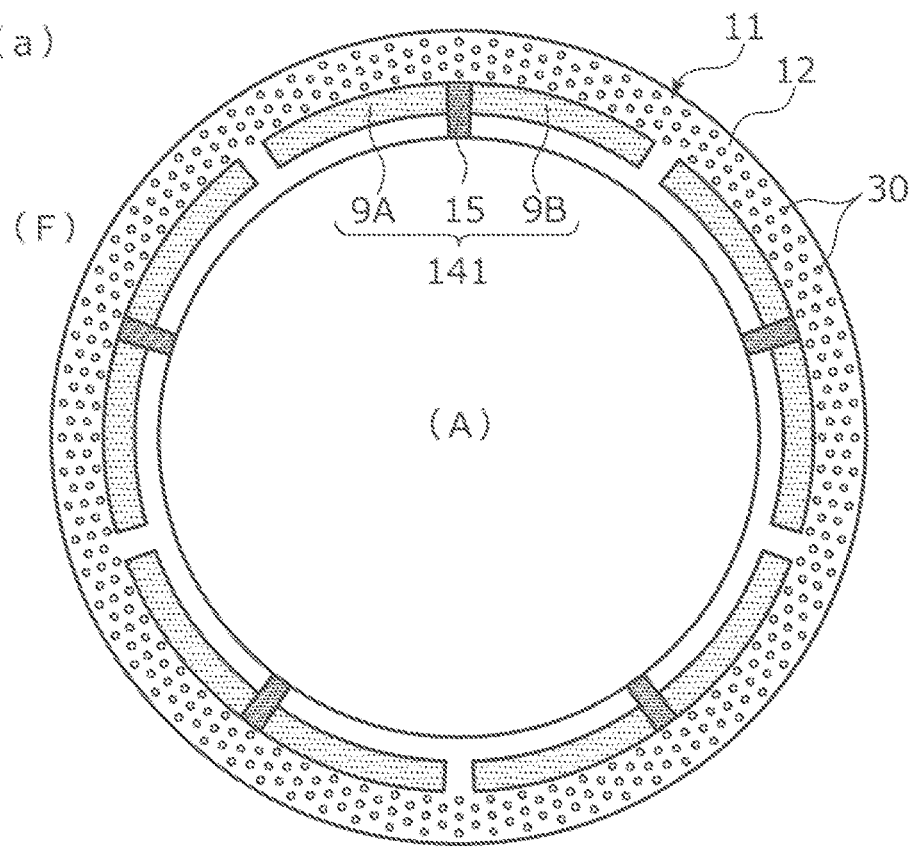
(b)
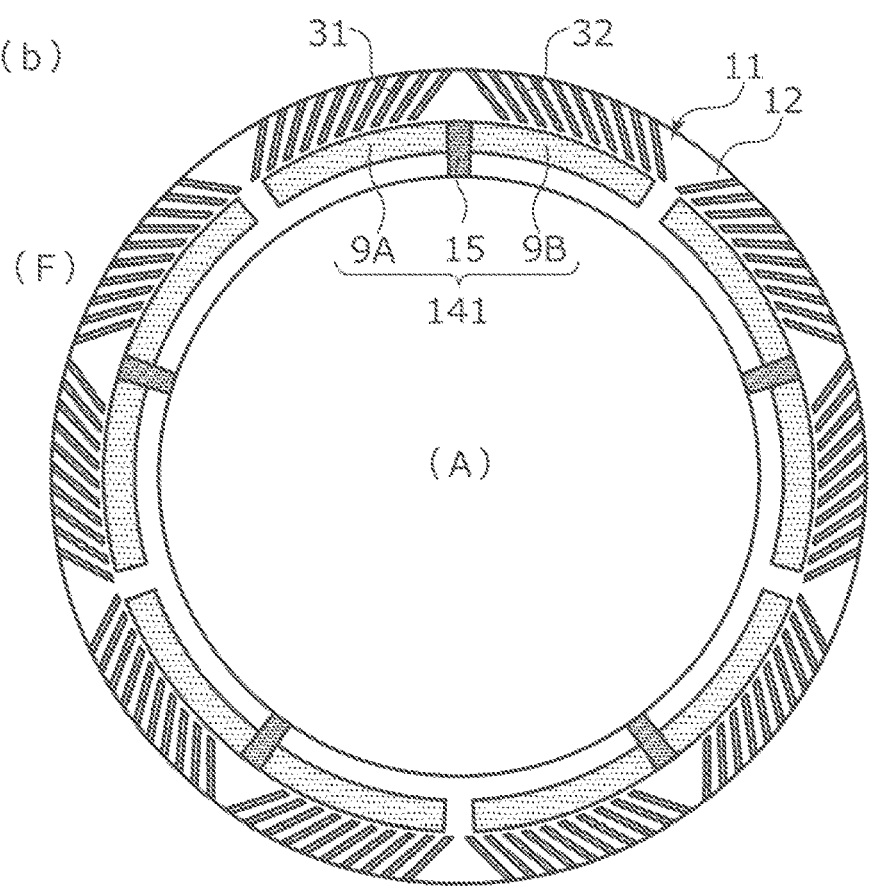

Fig.12
(a)
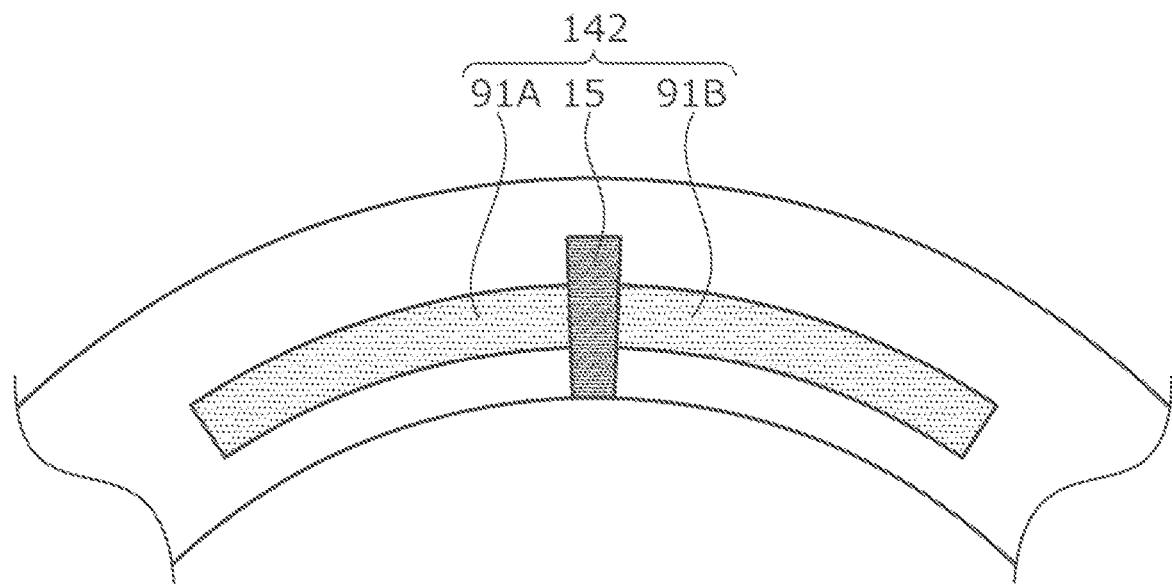
(b)
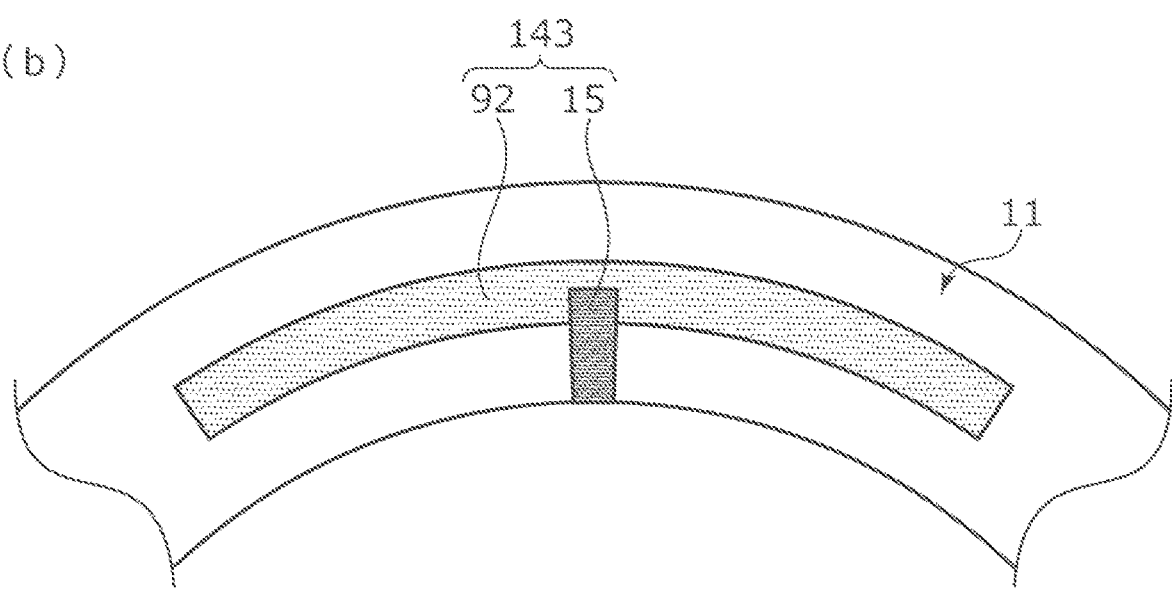

Fig. 13
(a)
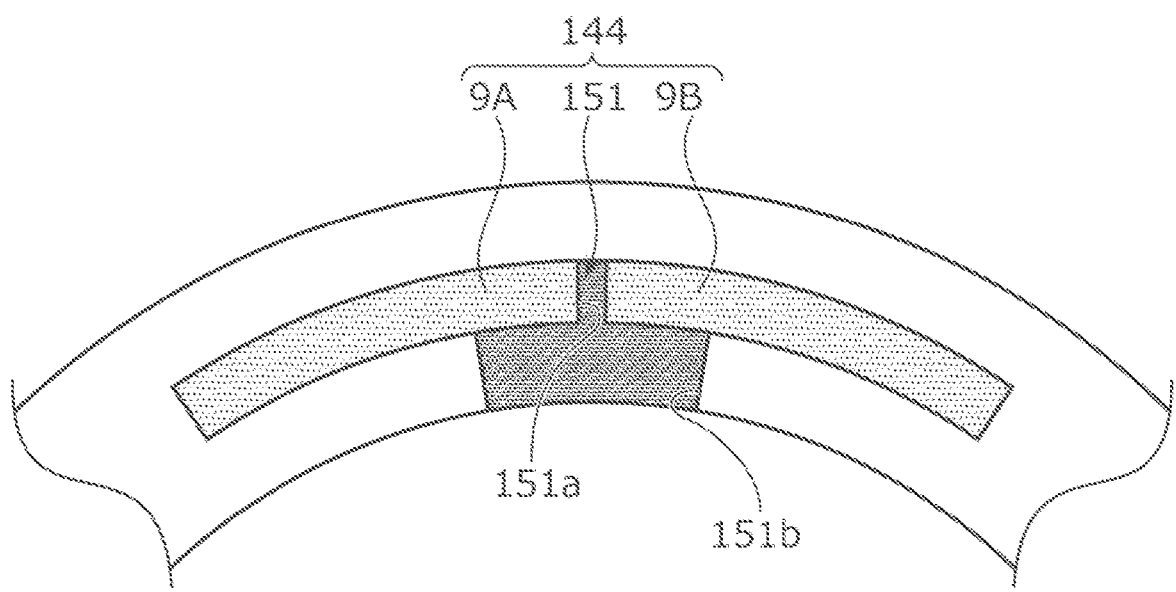
(b)
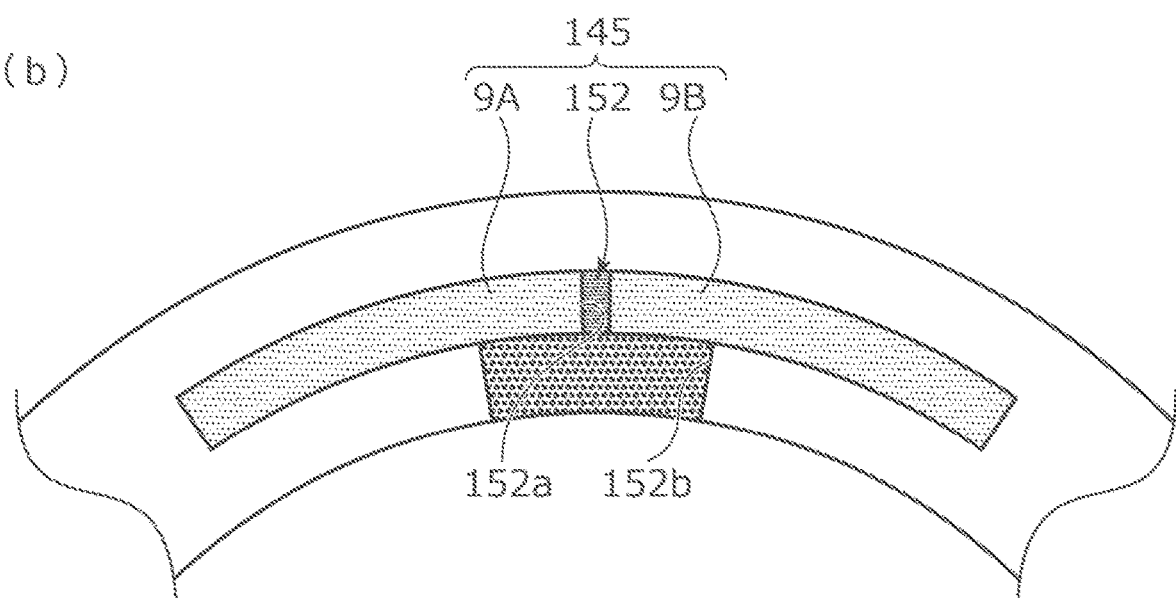

Fig. 14
(a)
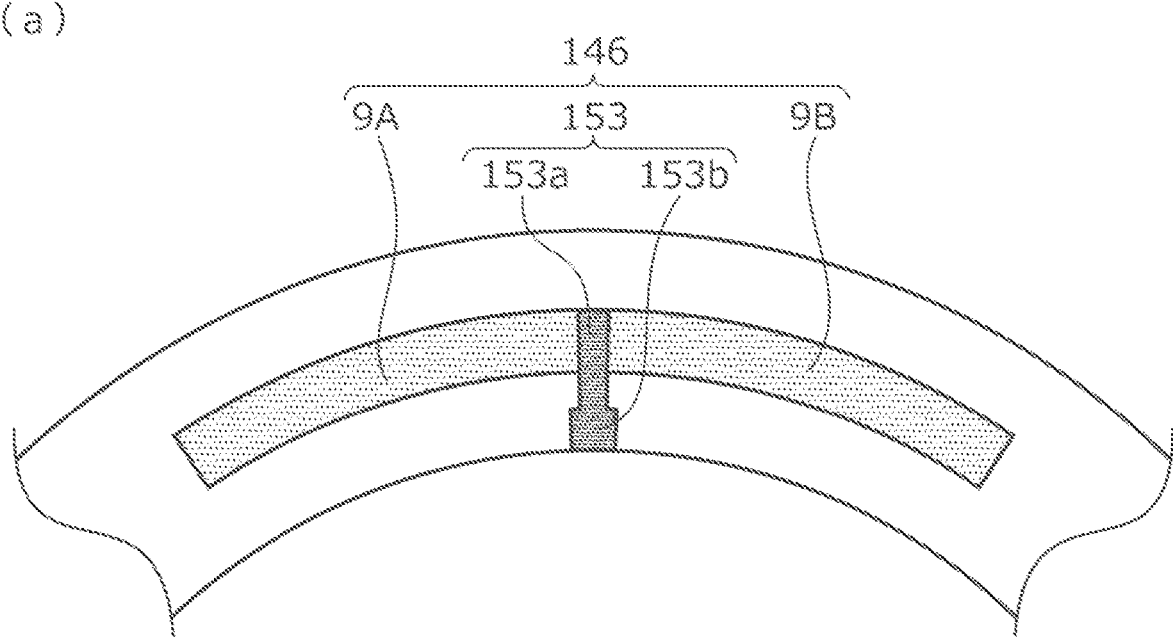
(b)
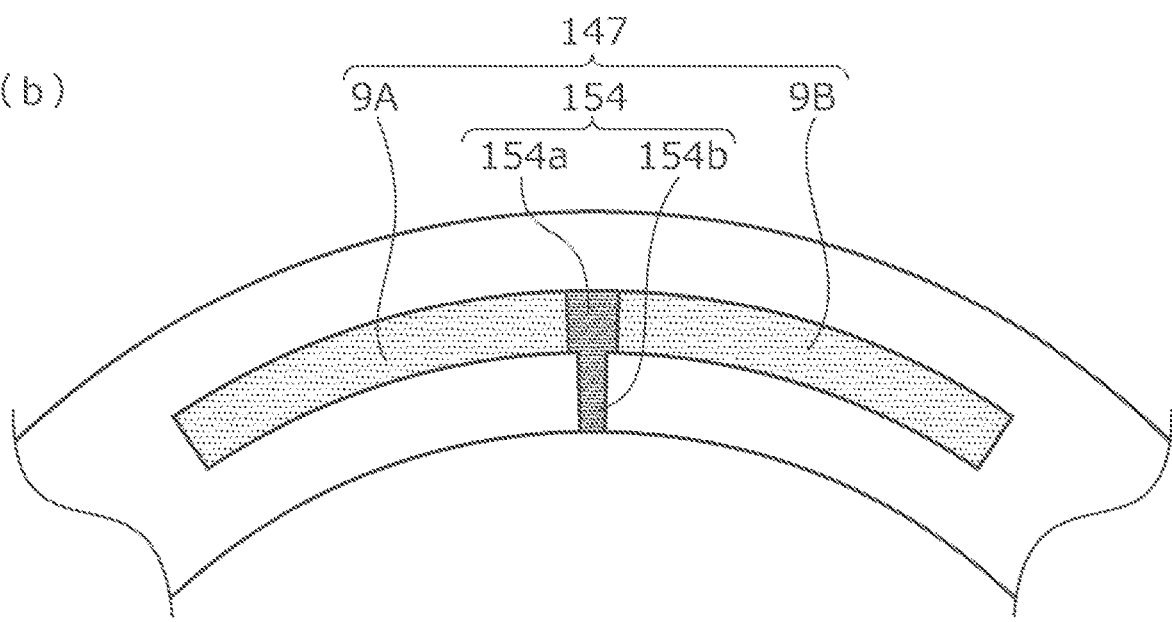

Fig. 15
(a)
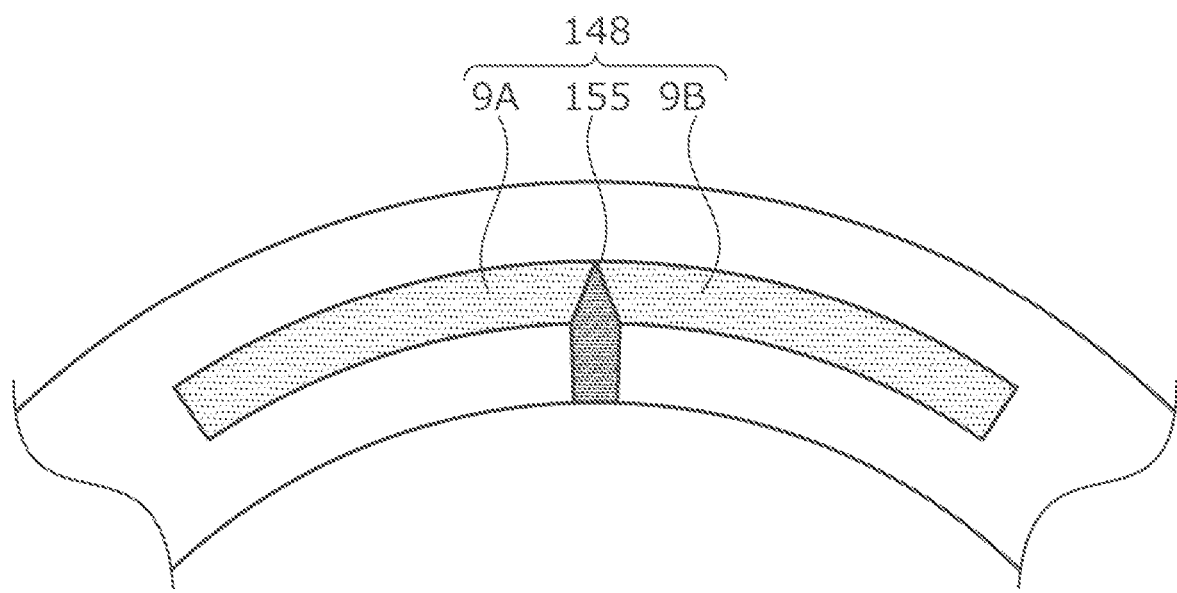
(b)
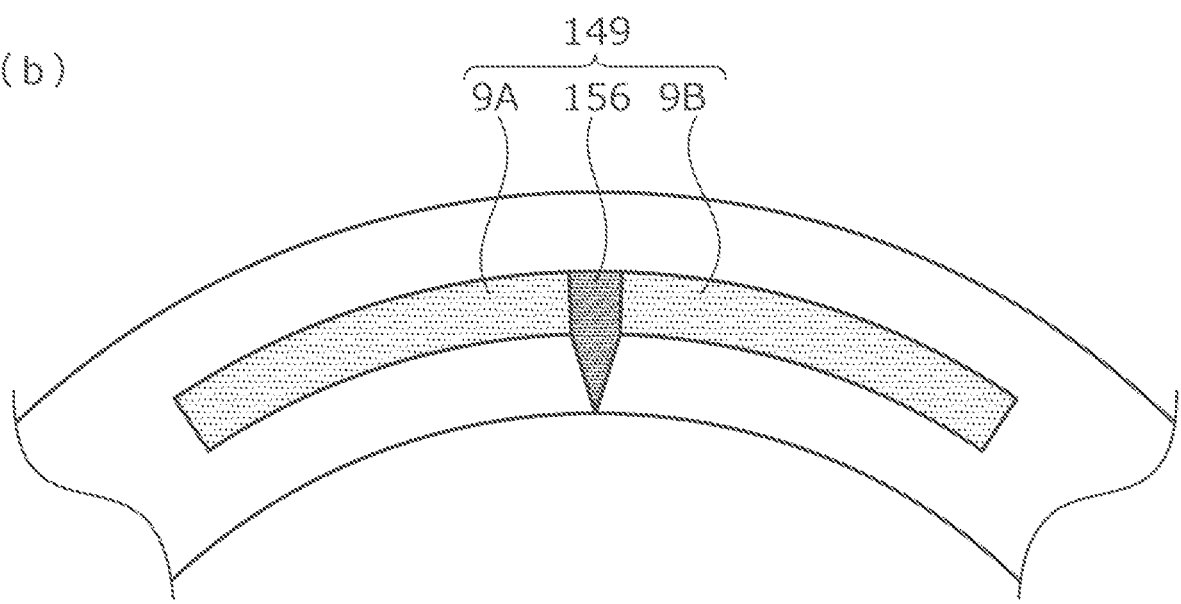

Fig. 16
(a)
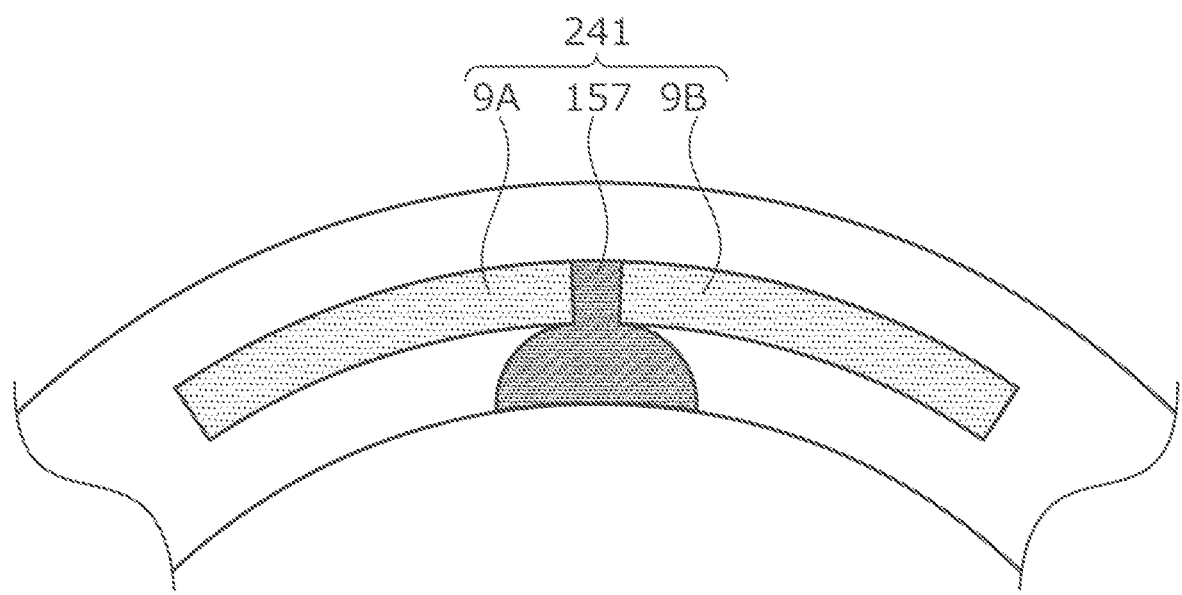
(b)
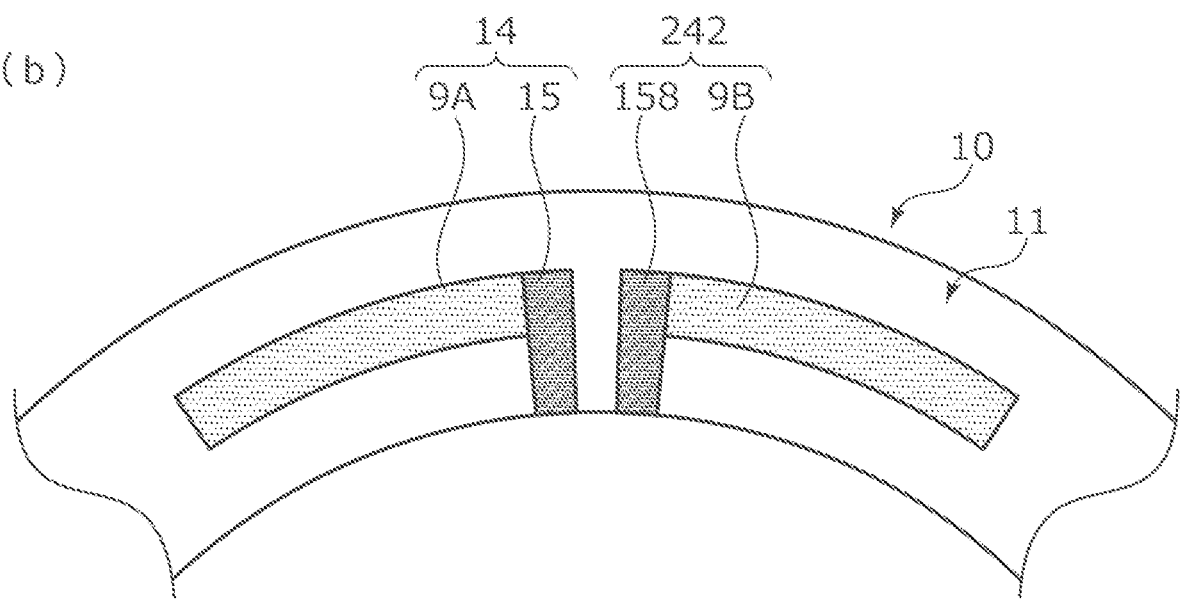

SLIDING COMPONENT

TECHNICAL FIELD

The present invention relates to a sliding component that is subjected to relative rotation, for example, a sliding component used in a seal device that seals a rotating shaft of a rotary machine in an automobile, a general industrial machine, or other sealing fields, or a sliding component used in a bearing of an automobile, a general industrial machine, or a machine in other bearing fields.

BACKGROUND ART

As a seal device that prevents leakage of a sealed liquid, for example, there is a mechanical seal including a pair of sliding components which have an annular shape and rotate relative to each other to cause sliding surfaces to slide against each other. In such a mechanical seal, in recent years, there has been a desire that energy lost by sliding is reduced for environmental measures, and the sliding surface of the sliding component is provided with a positive pressure generating groove communicating with an outer diameter side which is a sealed liquid side of a high pressure, and having a closed one end in the sliding surface. Accordingly, when the sliding components rotate relative to each other, a positive pressure is generated in the positive pressure generating groove to separate the sliding surfaces from each other, and the sealed liquid is introduced into the positive pressure generating groove from the outer diameter side to be held therein. Therefore, the lubricity is improved, and the friction is reduced.

Further, in order to maintain sealability for a long period of time, the mechanical seal is required to satisfy a condition such as "sealing" in addition to "lubrication". For example, in a mechanical seal described in Patent Citation 1, one sliding component is provided with a Rayleigh step and a reverse Rayleigh step that communicate with a sealed liquid side. Accordingly, when sliding components rotate relative to each other, a positive pressure is generated between sliding surfaces by the Rayleigh step, to separate the sliding surfaces from each other, and the Rayleigh step holds a sealed liquid. Therefore, the lubricity is improved. Meanwhile, since a relatively negative pressure is generated in the reverse Rayleigh step, and the reverse Rayleigh step is disposed closer to a leakage side than the Rayleigh step, the sealed liquid of a high pressure which has flowed out from the Rayleigh step to a gap between the sliding surfaces can be suctioned into the reverse Rayleigh step. In such a manner, the sealed liquid between a pair of the sliding components is prevented from leaking to the leakage side, so that the sealability is improved.

CITATION LIST

Patent Literature

Patent Citation 1: WO 2012/046749 A (pages 14 to 16 and FIG. 1)

SUMMARY OF INVENTION

Technical Problem

However, in Patent Citation 1, since a structure where the reverse Rayleigh step causes the sealed liquid to return to the sealed liquid side is adopted, the sealed liquid is not supplied to the leakage side in the gap between the sliding surfaces, and there is a portion which has no contribution to lubricity, which is a problem. Therefore, sliding components having higher lubricity are required.

The present invention has been made in view of such a problem, and an object of the present invention is to provide a sliding component that supplies a sealed fluid to a leakage side in a gap between sliding surfaces to exhibit high lubricity and has a small leakage of the sealed fluid.

Solution to Problem

In order to solve the above problem, according to the present invention, there is provided a sliding component that has an annular shape and is disposed in a place where relative rotation is performed in a rotary machine, including a plurality of dynamic pressure generating mechanisms, in which the plurality of dynamic pressure generating mechanisms are provided in a sliding surface of the sliding component, each of the dynamic pressure generating mechanisms including a deep groove portion that communicates with a leakage side, and at least one shallow groove portion that communicates with the deep groove portion and extends in a circumferential direction. the shallow groove portion being shallower than the deep groove portion. According to the aforesaid feature of the present invention, the deep groove portion has a deep groove depth and a large volume, so that a large amount of the sealed fluid supplied to the leakage side of the sliding surface is recovered, and the sealed fluid flows out from the shallow groove portion to a gap between sliding surfaces. Therefore, lubricity can be improved over a wide area of the sliding surface. In addition, since the sealed fluid is recovered by the deep groove portion communicating with the leakage side, and the recovered sealed fluid flows out from the shallow groove portion to the gap between the sliding surfaces to partly return to a sealed fluid side in a radial direction, the amount of the sealed fluid leaking to the leakage side is small.

It might be preferable that the deep groove portion extends in a radial direction. According to this preferable configuration, the sealed fluid can be held in the deep groove portion without being affected by dynamic pressure.

It might be preferable that a step in a depth direction is formed in a communication part between the shallow groove portion and the deep groove portion. According to this preferable configuration, the sealed fluid can be held in the deep groove portion without being affected by dynamic pressure.

It might be preferable that each of the plurality of dynamic pressure generating mechanisms includes a first shallow groove portion and a second shallow groove portion extend from each of the deep groove portions to both sides in the circumferential direction. According to this preferable configuration, the shallow groove portion which is disposed on one side in the circumferential direction of the deep groove portion can be used as a shallow groove portion for generating dynamic pressure. Therefore, the shallow groove portions can be used without being limited by the relative rotational direction of the sliding component.

It might be preferable that the plurality of dynamic pressure generating mechanisms includes a first dynamic pressure generating mechanism and a second dynamic pressure generating mechanism adjacent to each other in the circumferential direction, the first shallow groove portion of the first dynamic pressure generating mechanism is adjacent, in the circumferential direction, to the second shallow groove portion of the second dynamic pressure generating mechanism. According to this preferable configuration, during relative rotation of the sliding component, the sealed fluid which is supplied from the one shallow groove portion of the dynamic pressure generating mechanism to the gap between the sliding surfaces to tend to move the leakage side can be recovered by the other shallow groove portion of the dynamic pressure generating mechanism adjacent thereto.

It might be preferable that the deep groove portion communicates with an inner diameter side of the sliding component. According to this preferable configuration, the sealed fluid which has been supplied from the shallow groove portion to the gap between the sliding surfaces can return to the sealed fluid side due to centrifugal force, and the sealed fluid is easily held in the deep groove portion due to centrifugal force.

It might be preferable that the sliding surface of the sliding component may be provided with a specific dynamic pressure generating mechanism that is disposed on a sealed fluid side with respect to the dynamic pressure generating mechanism and is independent of the dynamic pressure generating mechanism. According to this preferable configuration, during relative rotation of the sliding component, while the specific dynamic pressure generating mechanism separates the sliding surfaces from each other to form an appropriate fluid film between the sliding surfaces, the amount of leakage of the sealed fluid to the leakage side can be reduced.

Incidentally, the fact that the shallow groove portion of the sliding component according to the present invention extends in the circumferential direction means that the shallow groove portion may extend with at least a component in the circumferential direction, preferably, may extend such that the component along the circumferential direction is larger than the component in the radial direction. In addition, the fact that the deep groove portion extends in the radial direction means that the deep groove portion may extend with at least a component in the radial direction, preferably, may extend such that the component along the radial direction is larger than the component in the circumferential direction.

In addition, the sealed fluid may be a liquid, or have a mist form in which a liquid and a gas are mixed.

BRIEF DESCRIPTION OF DRAWINGS

FIGS. 5A to 5C are schematic views describing an operation in which a sealed liquid which is suctioned from an inner diameter side of a liquid guide groove portion at an initial stage of relative rotation flows out to a gap between sliding surfaces in the first embodiment.

FIG. 8A is a description view illustrating a first modification example of the third embodiment of the present invention, and FIG. 8B is a description view illustrating a second modification example of the third embodiment of the present invention.

FIG. 12A is a description view illustrating a third modification example of the first to fourth embodiments of the present invention, and FIG. 12B is a description view illustrating a fourth modification example of the first to fourth embodiments of the present invention.

FIG. 13A is a description view illustrating a fifth modification example the first to fourth embodiments of the present invention, and FIG. 13B is a description view illustrating a sixth modification example of the first to fourth embodiments of the present invention.

FIG. 14A is a description view illustrating a seventh modification example of the first to fourth embodiments of the present invention, and FIG. 14B is a description view illustrating an eighth modification example of the first to fourth embodiments of the present invention.

FIG. 15A is a description view illustrating a ninth modification example of the first to fourth embodiments of the present invention, and FIG. 15B is a description view illustrating a tenth modification example of the first to fourth embodiments of the present invention.

FIG. 16A is a description view illustrating an eleventh modification example of the first to fourth embodiments of the present invention, and FIG. 16B is a description view illustrating a twelfth modification example of the first to fourth embodiments of the present invention.

DESCRIPTION OF EMBODIMENTS

Figure 1:
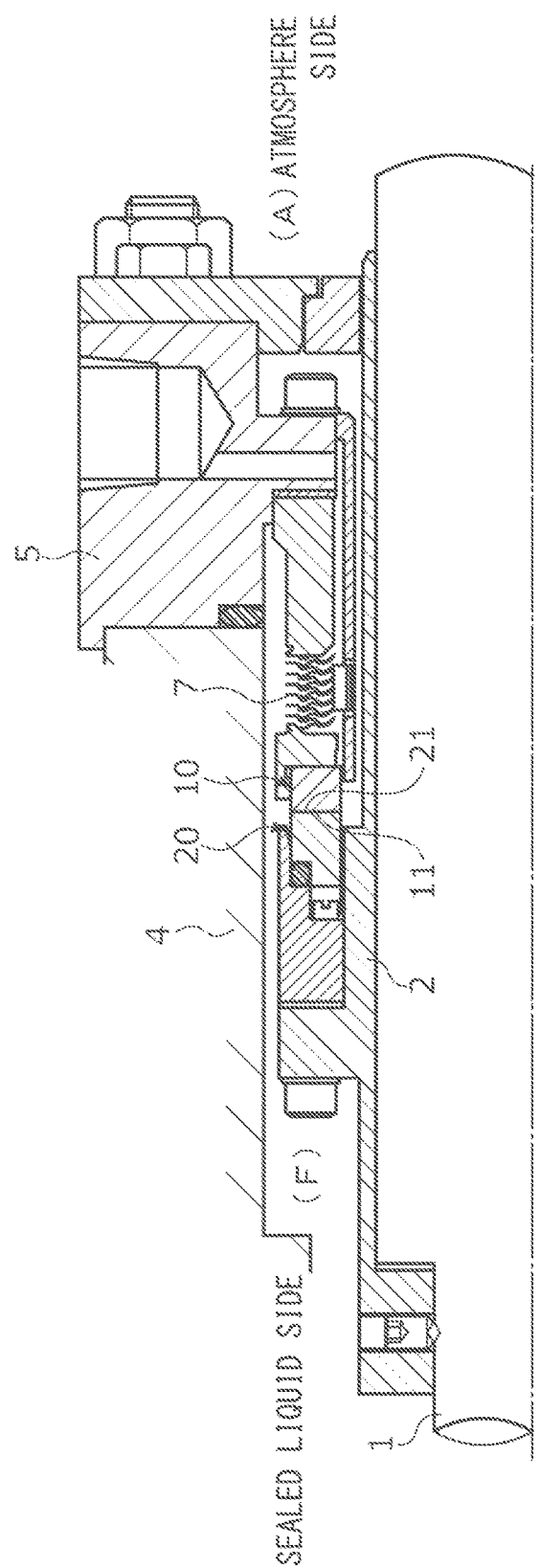
FIG. 1 is a longitudinal cross-sectional view illustrating a sliding component according to a first embodiment of the present invention.

Modes for implementing a sliding component according to the present invention will be described below based on embodiments.

First Embodiment

A sliding component according to a first embodiment of the present invention will be described with reference to FIGS. 1 to 5. Incidentally, in the present embodiment, a mode in which the sliding component is a mechanical seal will be described as an example. In addition, a description will be given based on the premise that an outer diameter side of the sliding component forming the mechanical seal is a sealed liquid side (i.e., high-pressure side) as a sealed fluid side and an inner diameter side is an atmosphere side (i.e., low-pressure side) as a leakage side. In addition, for convenience of description, in the drawings, dots may be added to a groove and the like formed in a sliding surface.

A mechanical seal for a general industrial machine illustrated in FIG. 1 is an inside mechanical seal that seals a sealed liquid F which tends to leak from an outer diameter side of sliding surfaces toward an inner diameter side, and mainly includes a rotating seal ring 20 which is a sliding component that has an annular shape and is provided on a rotating shaft 1 with a sleeve 2 interposed therebetween, to be rotatable together with the rotating shaft 1, and a stationary seal ring 10 that has an annular shape and is a sliding component which is provided on a seal cover 5 fixed to a housing 4 of a mounted apparatus, to not be rotated but be movable in an axial direction. The stationary seal ring 10 is biased in the axial direction by a bellows 7, so that a sliding surface 11 of the stationary seal ring 10 and a sliding surface 21 of the rotating seal ring 20 slide against each other in close contact with each other. Incidentally, the sliding surface 21 of the rotating seal ring 20 is a flat surface, and a recessed portion is not provided in the flat surface.

The stationary seal ring 10 and the rotating seal ring 20 are representatively made of SiC (as an example of hard material) or a combination of SiC (as the example of hard material) and carbon (as an example of soft material); the sliding material is not limited thereto, and any type of sliding material is applicable as long as the sliding material is used as a sliding material for a mechanical seal. Incidentally, as the SiC, there are materials consisting of different components and compositions of two or more phases including a sintered body in which boron, aluminum, carbon, or the like is used as a sintering additive, for example, reaction-sintered SiC, SiC—TiC, SiC—TiN, and the like consisting of Sic or SiC and Si in which graphite particles are dispersed. As the carbon, resin molded carbon, sintered carbon, and the like carbon including carbon in which a carbonaceous material and a graphite material are mixed can be used. In addition, in addition to the above sliding materials, metallic materials, resin materials, surface modifiers (such as coating materials), composite materials, or the like are also applicable.

Figure 2:
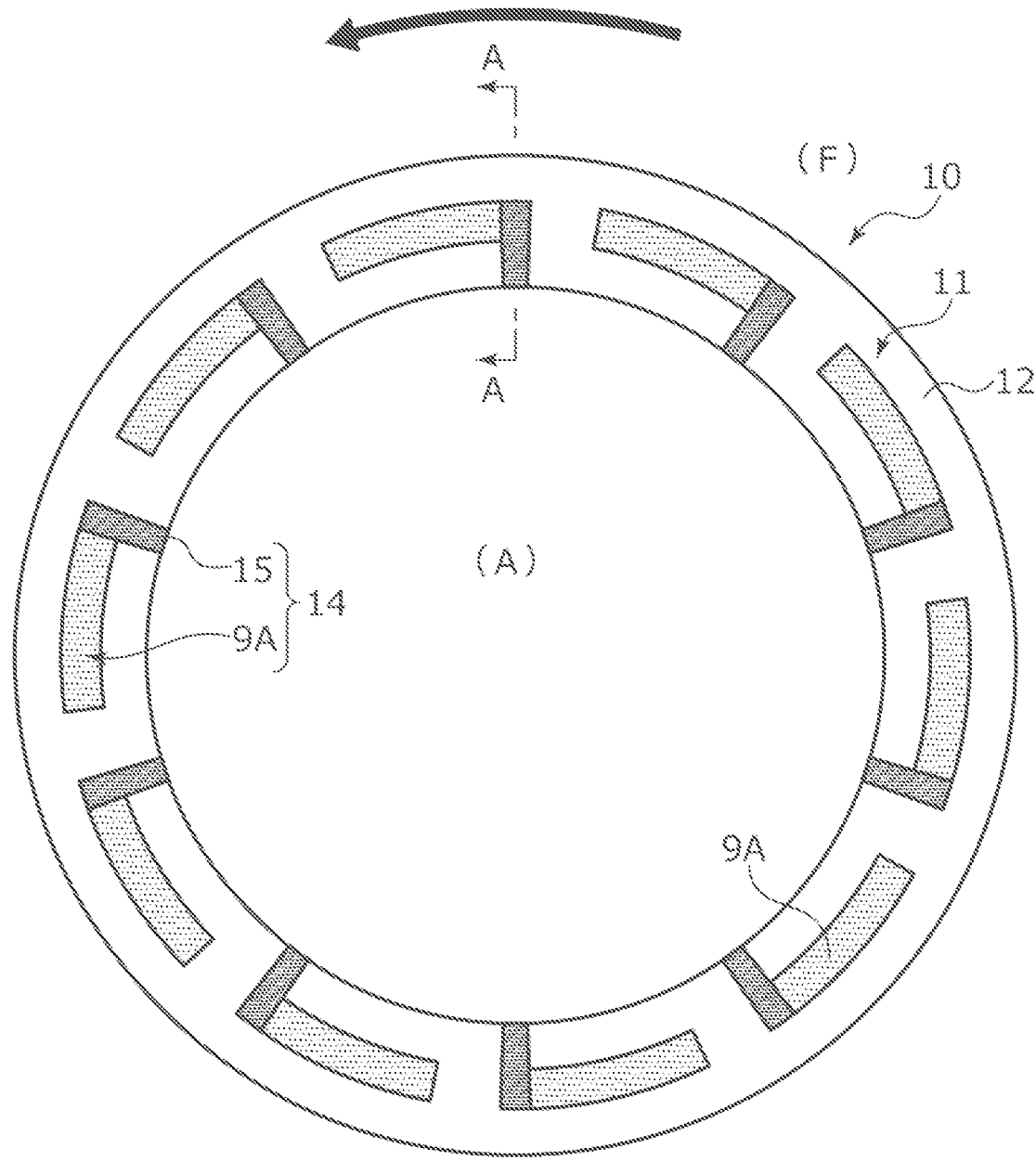
FIG. 2 is a view of a sliding surface of a stationary seal ring in the first embodiment when seen in an axial direction.

As illustrated in FIG. 2, the rotating seal ring 20 slides relative to the stationary seal ring 10 as indicated by an arrow, and a plurality of dynamic pressure generating mechanisms 14 are evenly provided in the sliding surface 11 of the stationary seal ring 10 in a circumferential direction of the stationary seal ring 10. A portion of the sliding surface 11 other than the dynamic pressure generating mechanisms 14 is a land 12 forming a flat surface.

Figure 3:
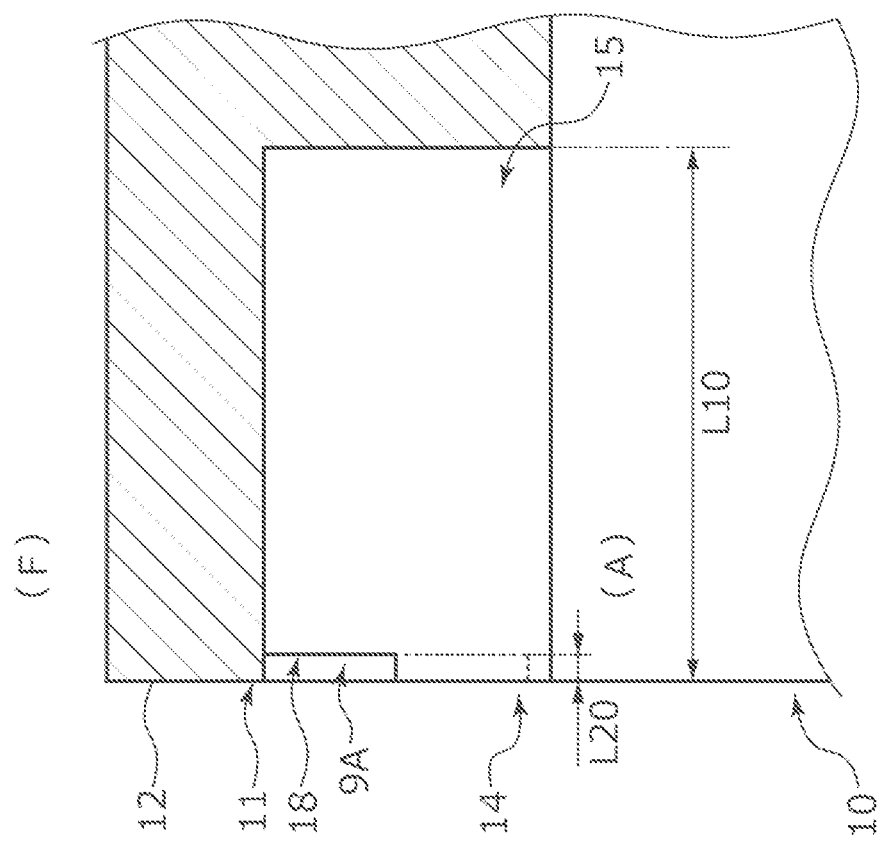
FIG. 3 is an A-A cross-sectional view in FIG. 2.
Figure 4:
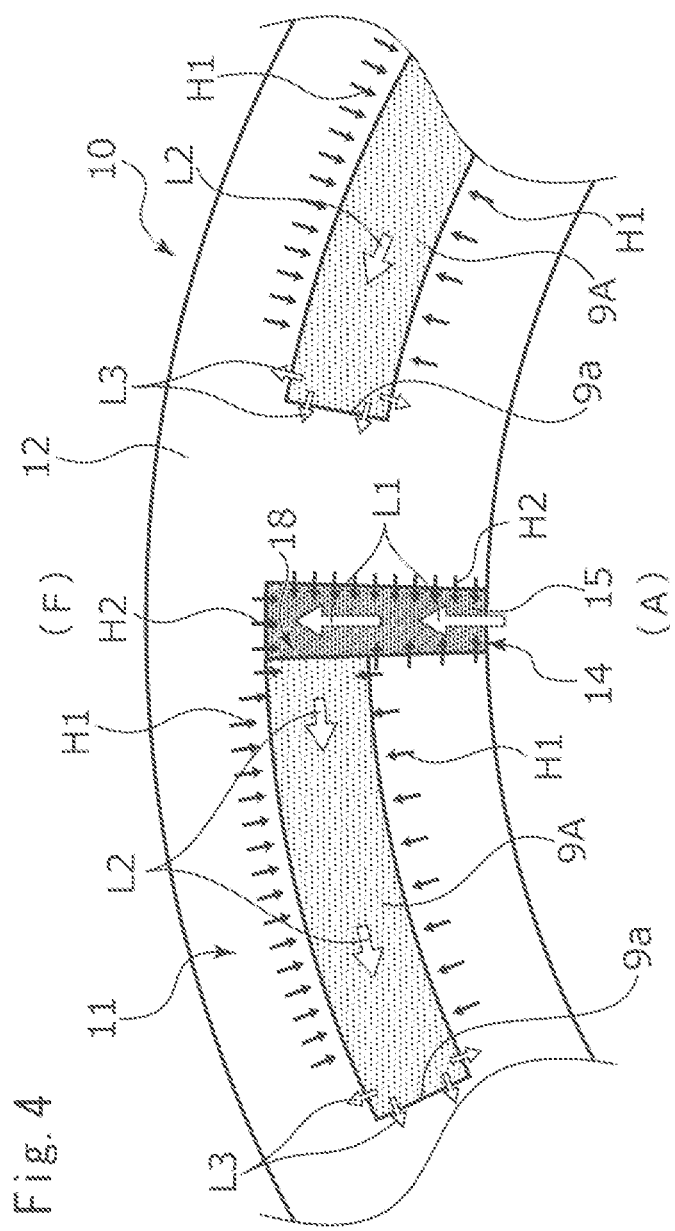
FIG. 4 is a main part enlarged view of the sliding surface of the stationary seal ring in the first embodiment.

Next, an outline of the dynamic pressure generating mechanism 14 will be described based on FIGS. 2 to 4. Incidentally, hereinafter, a description will be given based on the premise that when the stationary seal ring 10 and the rotating seal ring 20 rotate relative to each other, the left side of the drawing sheet of FIG. 4 is a downstream side of the sealed liquid F flowing in a Rayleigh step 9A to be described later, and the right side of the drawing sheet of FIG. 4 is an upstream side of the sealed liquid F flowing in the Rayleigh step 9A.

The dynamic pressure generating mechanism 14 includes a liquid guide groove portion 15 as a deep groove portion that communicates with the atmosphere side and extends in an outer diameter direction, and the Rayleigh step 9A as a shallow groove portion that extends concentrically with the stationary seal ring 10 from an outer diameter side end portion of the liquid guide groove portion 15 toward the downstream side in the circumferential direction. Namely, the dynamic pressure generating mechanism 14 has an inverted L shape formed by the liquid guide groove portion 15 and the Rayleigh step 9A, when seen in a direction orthogonal to the sliding surface 11. Incidentally, the liquid guide groove portion 15 of the first embodiment extends in a radial direction to be orthogonal to an axis of the stationary seal ring 10. In addition, the liquid guide groove portion 15 and the Rayleigh step 9A communicate with each other, and a step 18 in a depth direction is formed in a communication part.

In addition, a wall portion 9a orthogonal to a rotational direction is formed in an end portion on the downstream side of the Rayleigh step 9A. Incidentally, the wall portion 9a is not limited to being orthogonal to the rotational direction, for example, may be inclined with respect to the rotational direction or may be formed in a step shape.

In addition, a depth dimension $L10$ of the liquid guide groove portion 15 is larger than a depth dimension $L20$ of the Rayleigh step 9A ($L10>L20$). Specifically, in the first embodiment, the depth dimension $L10$ of the liquid guide groove portion 15 is 100 μm, and the depth dimension $L20$ of the Rayleigh step 9A is 5 μm. Namely, the step 18 in the depth direction is formed between the liquid guide groove portion 15 and the Rayleigh step 9A by a side surface on the downstream side of the liquid guide groove portion 15 and a bottom surface of the Rayleigh step 9A. Incidentally, as long as the depth dimension of the liquid guide groove portion 15 is larger than the depth dimension of the Rayleigh step 9A, the depth dimensions of the liquid guide groove portion 15 and the Rayleigh step 9A can be freely changed, and it is preferable that the dimension $L10$ is five times or more the dimension $L20$.

Incidentally, the bottom surface of the Rayleigh step 9A is a flat surface and is formed in parallel to the land 12; however, the flat surface is not prevented from being provided with a fine recessed portion or being formed to be inclined with respect to the land 12. Further, each of two arc-shaped surfaces of the Rayleigh step 9A is orthogonal to the bottom surface of the Rayleigh step 9A, the two arc-shaped surfaces extending in the circumferential direction. In addition, a bottom surface of the liquid guide groove portion 15 is a flat surface and is formed in parallel to the land 12; however, the flat surface is not prevented from being provided with a fine recessed portion or being formed to be inclined with respect to the land 12. Further, each of two flat surfaces of the liquid guide groove portion 15 is orthogonal to the bottom surface of the liquid guide groove portion 15, the two flat surfaces extending in the radial direction.

Next, the operation during relative rotation of the stationary seal ring 10 and the rotating seal ring 20 will be described. First, during non-operation of the general industrial machine, namely, when the rotating seal ring 20 does not rotate, a slight amount of the sealed liquid F on the outer diameter side of the sliding surfaces 11 and 21 enters a gap between the sliding surfaces 11 and 21 due to the capillary phenomenon, and in the dynamic pressure generating mechanism 14, the sealed liquid F which has remained during stop of the general industrial machine and the atmosphere which has entered from the inner diameter side of the sliding surfaces 11 and 21 are mixed. Incidentally, since the sealed liquid F has a higher viscosity than a gas, the amount of leakage from the dynamic pressure generating mechanism 14 to a low-pressure side during stop of the general industrial machine is small.

In a case where almost no sealed liquid F remains in the dynamic pressure generating mechanism 14 during stop of the general industrial machine, when the rotating seal ring 20 rotates relative to the stationary seal ring 10 (refer to the black arrow of FIG. 2), as illustrated in FIG. 4, a low-pressure side fluid A on the atmosphere side is introduced from the liquid guide groove portion 15 as indicated by an arrow L1, and the Rayleigh step 9A causes the low-pressure side fluid A to move in a following manner in the rotational direction of the rotating seal ring 20 as indicated by an arrow L2, so that dynamic pressure is generated in the Rayleigh step 9A.

The pressure is the highest in the vicinity of the wall portion 9a which is the end portion on the downstream side of the Rayleigh step 9A, so that the low-pressure side fluid A flows out from the vicinity of the wall portion 9a to the periphery thereof as indicated by an arrow L3. Incidentally, the pressure decreases gradually as the upstream side of the Rayleigh step 9A is approached.

In addition, when the stationary seal ring 10 and the rotating seal ring 20 rotate relative to each other, the sealed liquid F of a high pressure flows into the gap between the sliding surfaces 11 and 21 from the outer diameter side thereof at all times to perform so-called fluid lubrication. At this time, since the pressure of the sealed liquid F in the vicinity of the Rayleigh step 9A, as described above, particularly on the downstream side of the Rayleigh step 9A is high, as indicated by an arrow H1, the sealed liquid F remains located on the land 12 to hardly enter the Rayleigh step 9A. On the other hand, since the liquid guide groove portion 15 is a deep groove portion and communicates with the low-pressure side, as indicated by an arrow H2, the sealed liquid F in the vicinity of the liquid guide groove portion 15 easily enters the liquid guide groove portion 15. In addition, since the sealed liquid F is a liquid and has large surface tension, the sealed liquid F moves along side wall surfaces of the liquid guide groove portion 15 to easily enter the liquid guide groove portion 15.

Next, an operation in which the sealed liquid F suctioned into the liquid guide groove portion 15 flows out to the gap between the sliding surfaces 11 and 21 will be described.

In a case where almost no sealed liquid F remains in the dynamic pressure generating mechanism 14, when the rotating seal ring 20 rotates relative to the stationary seal ring 10 (refer to the black arrow of FIG. 2), as illustrated in FIG. 5A, the sealed liquid F which has entered the liquid guide groove portion 15 becomes an agglomerated droplet as indicated by reference sign H3. Thereafter, as illustrated in FIG. 5B, when the droplet reaches a certain volume, as indicated by reference sign H4, the droplet is suctioned into the Rayleigh step 9A due to a relatively low pressure formed on the upstream side of the Rayleigh step 9A. At the same time, the sealed liquid F newly enters the liquid guide groove portion 15 to become a droplet H3'. At this time, the sealed liquid F of a larger amount than the amount at an initial stage of the relative rotation in FIG. 5A enters the liquid guide groove portion 15.

Thereafter, as illustrated in FIG. 5C, the sealed liquid F suctioned into the Rayleigh step 9A receives a large shearing force from the rotating seal ring 20 to move to the downstream side in the Rayleigh step 9A while the pressure increases, as indicated by an arrow H5, to flow out to the vicinity of the wall portion 9a. At the same time, a larger amount of the sealed liquid F newly enters the liquid guide groove portion 15 to become a droplet H3", and as indicated by reference sign H4', the droplet H3' is suctioned into the Rayleigh step 9A.

Thereafter, the amount of the sealed liquid F entering the liquid guide groove portion 15 is further increased than in the state illustrated in FIG. 5C, and a steady state where the sealed liquid F flows out continuously from the Rayleigh step 9A to the gap between the sliding surfaces 11 and 21 is reached. In the steady state, the sealed liquid F of a high pressure flows into the gap between the sliding surfaces 11 and 21 from the outer diameter side thereof or the Rayleigh step 9A at all times to perform fluid lubrication as described above. Incidentally, the time until the steady state is reached via the states of FIGS. 5A to 5C is a transient short time. In addition, when the sealed liquid F remains in the dynamic pressure generating mechanism 14 during stop of the general industrial machine, depending on the amount of the sealed liquid F remaining in the dynamic pressure generating mechanism 14, the operation starts from any one of the state of FIG. 5A, the state of FIG. 5B, the state of FIG. 5C, and the steady state.

Here, since the liquid guide groove portion 15 is a deep groove portion and communicates with the low-pressure side, the sealed liquid F indicated by the arrow H5 is easily suctioned into the liquid guide groove portion 15 adjacent thereto, so that the amount of the sealed liquid F between the sliding surfaces 11 and 21 is stable and high lubricity can be maintained. In addition, since a liquid has a larger interfacial tension for a solid than a gas, the sealed liquid F is easily held between the sliding surfaces 11 and 21, and the atmosphere is easily discharged to the inner diameter side of the stationary seal ring 10 and the rotating seal ring 20.

As described above, when the stationary seal ring 10 and the rotating seal ring 20 rotate relative to each other, the sealed liquid F which has entered the liquid guide groove portion 15 is suctioned into the Rayleigh step 9A, so that dynamic pressure is generated therein. Since the liquid guide groove portion 15 has a deep groove depth and a large volume, even when the sealed liquid F is supplied to the low-pressure side of the sliding surface 11, the sealed liquid F is recovered and returned from the Rayleigh step 9A to the gap between the sliding surfaces 11 and 21. Therefore, the lubricity can be improved over a wide area of the sliding surface 11. In addition, since the sealed liquid F is recovered by the liquid guide groove portion 15 communicating with the low-pressure side on the inner diameter side of the sliding surfaces 11 and 21, the amount of the sealed liquid F leaking to the low-pressure side is small.

In addition, since a large amount of the sealed liquid F is held in the liquid guide groove portion 15, the amount of the sealed liquid F suctioned into the Rayleigh step 9A can be sufficiently secured, and even when the amount of the sealed liquid F held in the liquid guide groove portion 15 increases or decreases in a short time, the amount of the sealed liquid F suctioned into the Rayleigh step 9A can be substantially constant, and the sliding surfaces 11 and 21 can be avoided from being subjected to poor lubrication. In addition, since the liquid guide groove portion 15 communicates with the low-pressure side, the pressure in the liquid guide groove portion 15 is lower than the pressure of the sealed liquid F between the sliding surfaces 11 and 21, and the sealed liquid F in the vicinity of the liquid guide groove portion 15 is easily suctioned into the liquid guide groove portion 15.

In addition, the liquid guide groove portion 15 extends in the radial direction. Specifically, since the liquid guide groove portion 15 extends in a direction orthogonal to a center axis of the stationary seal ring 10, and the Rayleigh step 9A is disposed in the circumferential direction from the outer diameter side end portion of the liquid guide groove portion 15 to intersect the liquid guide groove portion 15, the liquid guide groove portion 15 is unlikely to be affected by the inertia or dynamic pressure of a flow of the sealed liquid F, which is generated in the Rayleigh step 9A. For this reason, the sealed liquid F or the low-pressure side fluid A adhering to an inside surface of the stationary seal ring 10 is unlikely to be directly suctioned into the Rayleigh step 9A from the inner diameter side of the liquid guide groove portion 15. In addition, the sealed liquid F can be held in the liquid guide groove portion 15 without being directly affected by dynamic pressure.

In addition, the width in the circumferential direction of the liquid guide groove portion 15 is shortened, so that a large number of the stationary seal rings 10 can be disposed in the circumferential direction. Therefore, the degree of freedom in design is high. Incidentally, the liquid guide groove portion 15 is not limited to extending in the direction orthogonal to the center axis of the stationary seal ring 10, and may be inclined from a position orthogonal to the center axis of the stationary seal ring 10. It is preferable that the inclination is less than 45 degrees. Further, the shape of the liquid guide groove portion 15 can be freely changed to an arc shape or the like.

In addition, since the step 18 is formed in the communication part between the Rayleigh step 9A and the liquid guide groove portion 15 by the side surface on the downstream side of the liquid guide groove portion 15 and the bottom surface of the Rayleigh step 9A, the sealed liquid F can be held in the liquid guide groove portion 15 without being directly affected by dynamic pressure.

In addition, since the Rayleigh step 9A communicates with the liquid guide groove portion 15 over the entire width in the radial direction, an opening region of the Rayleigh step 9A to the liquid guide groove portion 15 can be secured, and the sealed liquid F held in the liquid guide groove portion 15 can be efficiently suctioned up.

In addition, the liquid guide groove portion 15 communicates with the inner diameter side of the stationary seal ring 10. Namely, the sliding component is an inside mechanical seal, and when the stationary seal ring 10 and the rotating seal ring 20 rotate relative to each other, the sealed liquid F in the Rayleigh step 9A can return to the high-pressure side due to centrifugal force, and a leakage of the sealed liquid F to the low-pressure side on the inner diameter side of the sliding surfaces 11 and 21 can be reduced.

In addition, since the dynamic pressure generating mechanism 14 is provided in the stationary seal ring 10, when the stationary seal ring 10 and the rotating seal ring 20 rotate relative to each other, the state inside the liquid guide groove portion 15 is easily kept close to atmospheric pressure.

Incidentally, in the first embodiment, a mode in which the liquid guide groove portion 15 and the Rayleigh step 9A form an inverted L shape when seen in the direction orthogonal to the sliding surface 11 has been provided as an example; however, for example, the liquid guide groove portion 15 and the Rayleigh step 9A may smoothly communicate with each other without intersecting each other, to form, for example, a linear shape or an arc shape.

In addition, the step 18 may not be provided in the communication part between the liquid guide groove portion 15 and the Rayleigh step 9A, for example, the liquid guide groove portion 15 and the Rayleigh step 9A may communicate with each other through an inclined surface. In this case, for example, a portion having a depth dimension of 5 μm or less can be the Rayleigh step 9A as a shallow groove portion, and a portion which is deeper than 5 μm can be the liquid guide groove portion 15 as a deep groove portion.

In addition, the shallow groove portion is not limited to extending concentrically with the stationary seal ring in the circumferential direction, for example, may be formed in an arc shape such that the end portion on the downstream side faces the high-pressure side. In addition, the shallow groove portion may extend linearly from the deep groove portion, or may extend in a meandering manner.

Second Embodiment

Next, a sliding component according to a second embodiment of the present invention will be described with reference to FIG. 6. Incidentally, the description of configurations which are the same as and duplicated from those in the first embodiment will be omitted.

Figure 6:
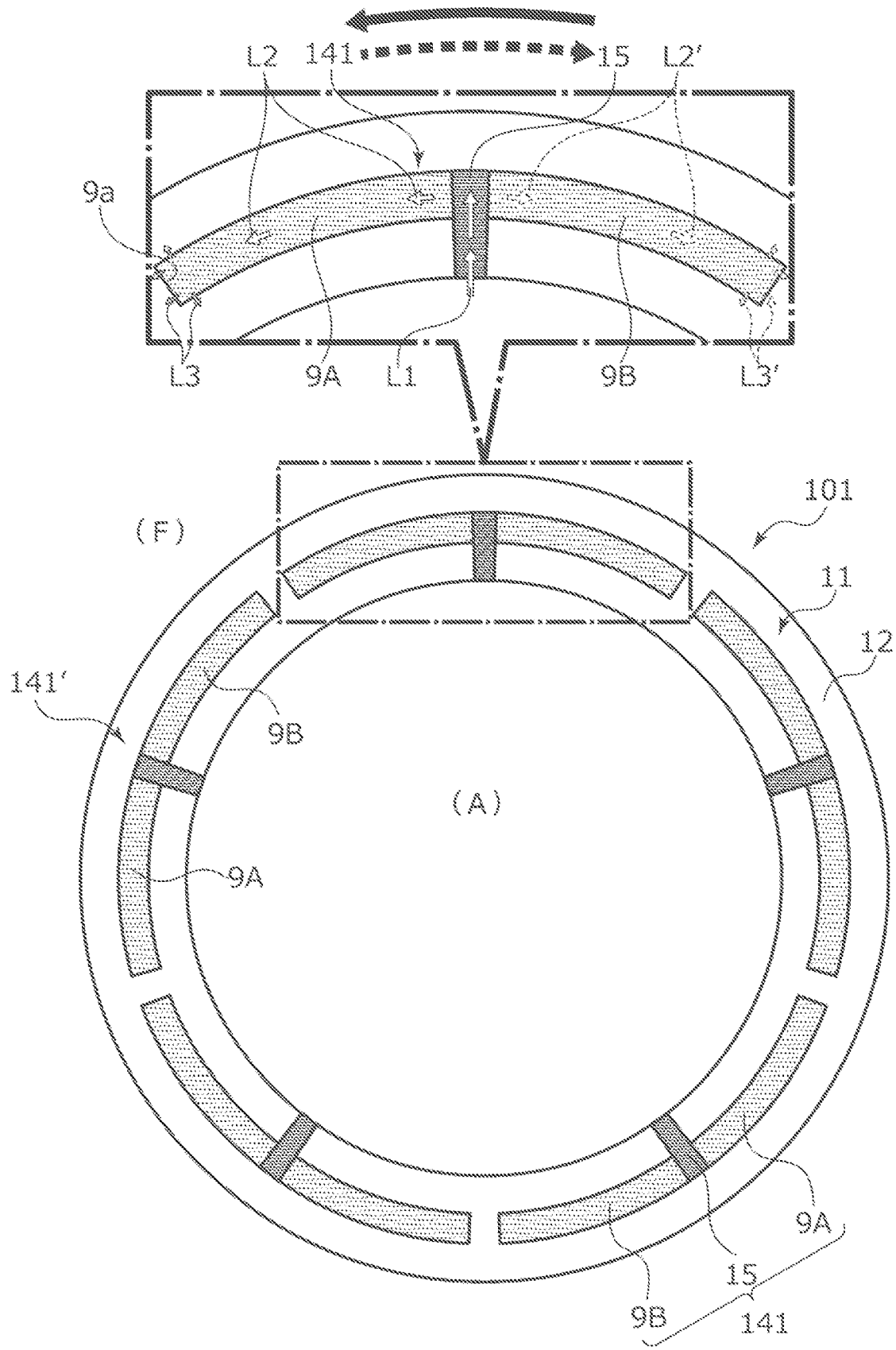
FIG. 6 is a view of a sliding surface of a stationary seal ring of a sliding component according to a second embodiment of the present invention when seen in the axial direction.

As illustrated in FIG. 6, a dynamic pressure generating mechanism 141 provided in a stationary seal ring 101 includes the liquid guide groove portion 15, the Rayleigh step 9A, and a reverse Rayleigh step 9B as a shallow groove portion that extends concentrically with the stationary seal ring 101 from the outer diameter side end portion of the liquid guide groove portion 15 toward the downstream side in the circumferential direction. Namely, the dynamic pressure generating mechanism 141 has a T shape when seen in the direction orthogonal to the sliding surface 11. In addition, the reverse Rayleigh step 9B is formed with the same depth dimension of 5 μm as that of the Rayleigh step 9A.

When the rotating seal ring 20 rotates counterclockwise on the drawing sheet as indicated by a solid arrow of FIG. 6, the low-pressure side fluid A moves in order of arrows L1, L2, and L3, so that dynamic pressure is generated in the Rayleigh step 9A. In addition, when the rotating seal ring 20 rotates clockwise on the drawing sheet as indicated by a dotted arrow of FIG. 6, the low-pressure side fluid A moves in order of arrows L1, L2', and L3', so that dynamic pressure is generated in the reverse Rayleigh step 9B. Namely, when the rotating seal ring 20 rotates clockwise on the drawing sheet of FIG. 6, the reverse Rayleigh step 9B functions as a Rayleigh step, and the Rayleigh step 9A functions as a reverse Rayleigh step.

As described above, since the Rayleigh step 9A and the reverse Rayleigh step 9B extend from the liquid guide groove portion 15 to both sides in the circumferential direction, and one of the Rayleigh step 9A and the reverse Rayleigh step 9B can be used as a shallow groove portion for generating dynamic pressure, the Rayleigh step 9A or the reverse Rayleigh step 9B can be used regardless of the relative rotational direction of the stationary seal ring 101 and the rotating seal ring 20.

In addition, the Rayleigh step 9A of the dynamic pressure generating mechanism 141 is adjacent, in the circumferential direction, to the reverse Rayleigh step 9B of a dynamic pressure generating mechanism 141' adjacent thereto. Accordingly, the sealed liquid F which flows out from the vicinity of the wall portion 9a of the Rayleigh step 9A of the dynamic pressure generating mechanism 141 to tend to move to the inner diameter side is suctioned from the reverse Rayleigh step 9B of the dynamic pressure generating mechanism 141' adjacent thereto. Therefore, a leakage of the sealed liquid F to the low-pressure side can be reduced.

Incidentally, in the second embodiment, a case where the Rayleigh step 9A and the reverse Rayleigh step 9B have the same depth dimension has been provided as an example; however, the Rayleigh step 9A and the reverse Rayleigh step 9B may be formed with different depth dimensions. In addition, both may be the same or different from each other also in length in the circumferential direction and width in the radial direction.

In addition, the Rayleigh step 9A of the dynamic pressure generating mechanism 141 and the reverse Rayleigh step 9B of the dynamic pressure generating mechanism 141' adjacent thereto may be separated from each other by a long distance in the circumferential direction to further increase the pressure which separates the sliding surfaces 11 and 21 from each other.

Third Embodiment

Next, a sliding component according to a third embodiment of the present invention will be described with reference to FIG. 7. Incidentally, the description of configurations which are the same as and duplicated from those in the second embodiment will be omitted.

Figure 7:
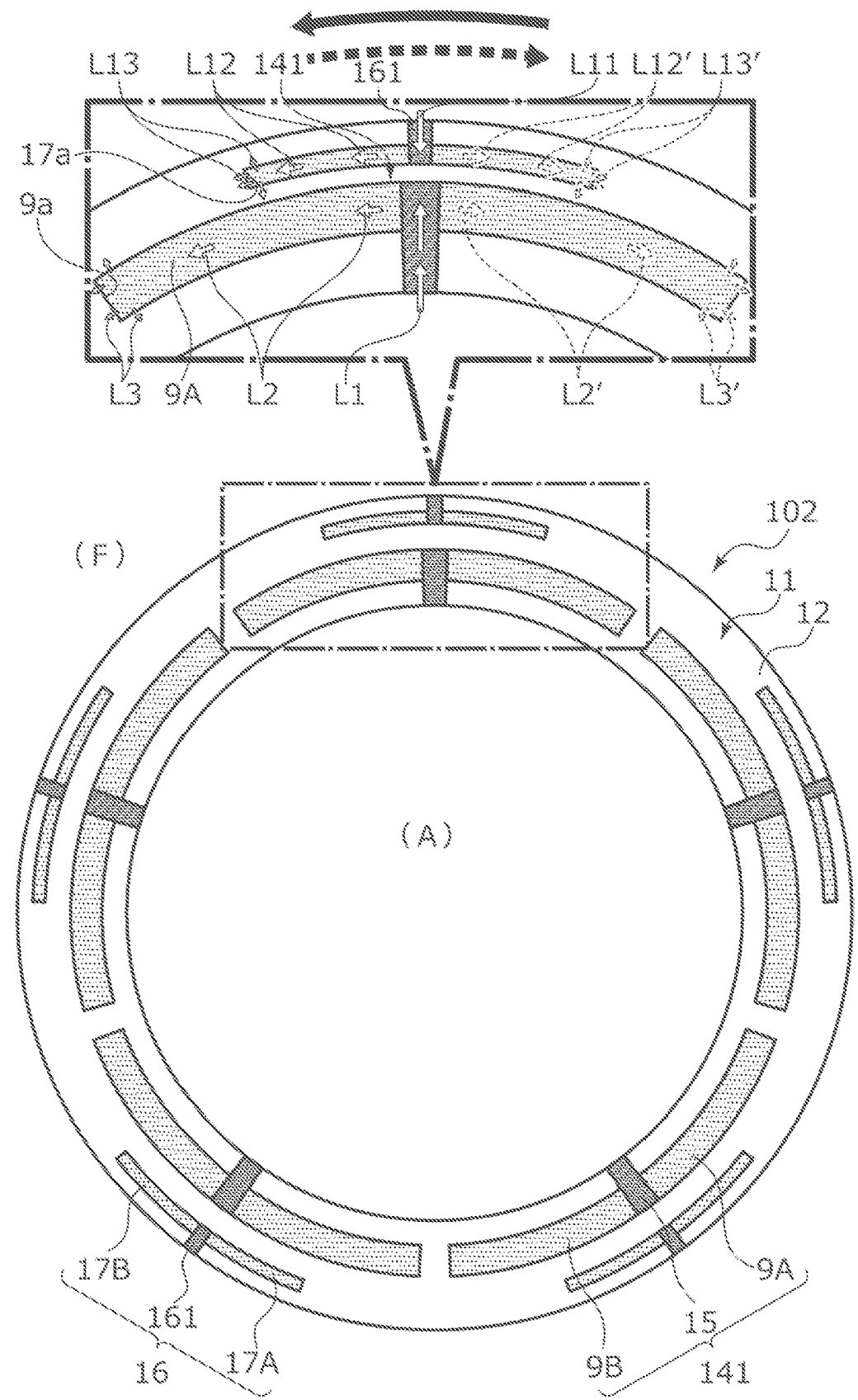
FIG. 7 is a view of a sliding surface of a stationary seal ring of a sliding component according to a third embodiment of the present invention when seen in the axial direction.

As illustrated in FIG. 7, a plurality of the dynamic pressure generating mechanisms 141 and a plurality of specific dynamic pressure generating mechanisms 16 are formed in a stationary seal ring 102. The specific dynamic pressure generating mechanism 16 includes a liquid guide groove portion 161 communicating with the high-pressure side, a Rayleigh step 17A that extends concentrically with the stationary seal ring 102 from an inner diameter side end portion of the liquid guide groove portion 161 toward the downstream side in the circumferential direction, and a reverse Rayleigh step 17B that extends concentrically with the stationary seal ring 102 from the inner diameter side end portion of the liquid guide groove portion 161 toward the upstream side in the circumferential direction. The liquid guide groove portion 161 and the liquid guide groove portion 15 are formed at positions corresponding to each other in the circumferential direction. In addition, the liquid guide groove portion 161 functions as a deep groove portion of the specific dynamic pressure generating mechanism 16, and the Rayleigh step 17A and the reverse Rayleigh step 17B function as shallow groove portions of the specific dynamic pressure generating mechanism 16.

The Rayleigh step 9A and the reverse Rayleigh step 9B of the dynamic pressure generating mechanism 141 are formed to be longer in the circumferential direction than the Rayleigh step 17A and the reverse Rayleigh step 17B of the specific dynamic pressure generating mechanism 16. In addition, the Rayleigh step 17A and the reverse Rayleigh step 17B are formed with the same depth dimension of 5 µm as that of the Rayleigh step 9A and the reverse Rayleigh step 9B. In addition, the width in the radial direction of the Rayleigh step 17A and the reverse Rayleigh step 17B is smaller than the width in the radial direction of the Rayleigh step 9A and the reverse Rayleigh step 9B. Namely, the volume of the dynamic pressure generating mechanism 141 is larger than the volume of the specific dynamic pressure generating mechanism 16.

When the rotating seal ring 20 rotates counterclockwise on the drawing sheet as indicated by a solid arrow of FIG. 7, the sealed liquid F moves in order of arrows L11, L12, and L13, so that dynamic pressure is generated in the Rayleigh step 17A. In addition, when the rotating seal ring 20 rotates clockwise on the drawing sheet as indicated by a dotted arrow of FIG. 7, the sealed liquid F moves in order of arrows L11, L12', and L13', so that dynamic pressure is generated in the reverse Rayleigh step 17B. In such a manner, regardless of the relative rotational direction of the stationary seal ring 102 and the rotating seal ring 20, dynamic pressure can be generated in the specific dynamic pressure generating mechanism 16.

In addition, while the dynamic pressure generated in the specific dynamic pressure generating mechanism 16 separates the sliding surfaces 11 and 21 from each other to form an appropriate liquid film therebetween, the sealed liquid F which tends to leak from the sliding surface 11 to the low-pressure side can be recovered by the dynamic pressure generating mechanism 141.

In addition, since the volume of the dynamic pressure generating mechanism 141 is larger than the volume of the specific dynamic pressure generating mechanism 16, the suctioning force of the Rayleigh step 9A and the reverse Rayleigh step 9B of the dynamic pressure generating mechanism 141 is increased, so that a balance in dynamic pressure between the dynamic pressure generating mechanism 141 on the low-pressure side and the specific dynamic pressure generating mechanism 16 on the high-pressure side can be adjusted.

In addition, since the wall portion 9a which is an end of the dynamic pressure generating mechanism 141 and a wall portion 17a which is an end of the specific dynamic pressure generating mechanism 16 are shifted from each other in the circumferential direction, the pressure can be distributed with good balance in the circumferential direction of the sliding surfaces 11 and 21.

Incidentally, the length in the circumferential direction of the Rayleigh step 9A and the reverse Rayleigh step 9B may be the same as that of the Rayleigh step 17A and the reverse Rayleigh step 17B, or may be shorter than that of the Rayleigh step 17A and the reverse Rayleigh step 17B. In addition, the Rayleigh step 17A and the reverse Rayleigh step 17B may be formed with a depth dimension different from that of the Rayleigh step 9A and the reverse Rayleigh step 9B. In addition, the width in the radial direction of the Rayleigh step 17A and the reverse Rayleigh step 17B may be larger than the width in the radial direction of the Rayleigh step 9A and the reverse Rayleigh step 9B. Preferably, the volume of the dynamic pressure generating mechanism 141 may be larger than the volume of the specific dynamic pressure generating mechanism 16.

Next, modification examples of the specific dynamic pressure generating mechanism will be described. As illustrated in FIG. 8A, a specific dynamic pressure generating mechanism of a first modification example is a dimple 30 having a circular recess shape when seen in the direction orthogonal to the sliding surface 11. Incidentally, the shape, number, disposition, and the like of the dimples 30 can be freely changed.

In addition, as illustrated in FIG. 8B, a specific dynamic pressure generating mechanism of a second modification example includes arc grooves 31 and 32 that extend in an arc shape while being inclined in the radial direction. Specifically, outer diameter side end portions of the arc grooves 31 and 32 communicate with the high-pressure side. A plurality of the arc grooves 31 are provided on the outer diameter side of the Rayleigh step 9A, and a plurality of the arc grooves 32 are provided on the outer diameter side of the reverse Rayleigh step 9B.

In addition, the arc groove 31 has a shape such that when the rotating seal ring 20 rotates counterclockwise on the drawing sheet of FIG. 8B, the sealed liquid F moves toward the inner diameter side, and the arc groove 32 has a shape such that when the rotating seal ring 20 rotates clockwise on the drawing sheet of FIG. 8B, the sealed liquid F moves toward the inner diameter side. When the rotating seal ring 20 rotates counterclockwise, the pressure on the inner diameter side of the arc groove 31 increases, and when the rotating seal ring 20 rotates clockwise, the pressure on the inner diameter side of the arc groove 32 increases. Therefore, the sliding surfaces 11 and 21 can be separated from each other to form an appropriate liquid film therebetween. Incidentally, the shape, number, disposition, and the like of the arc grooves 31 and 32 can be freely changed.

Fourth Embodiment

Next, a sliding component according to a fourth embodiment of the present invention will be described with reference to FIG. 9. Incidentally, the description of configurations which are the same as and duplicated from those in the second embodiment will be omitted.

Figure 9:
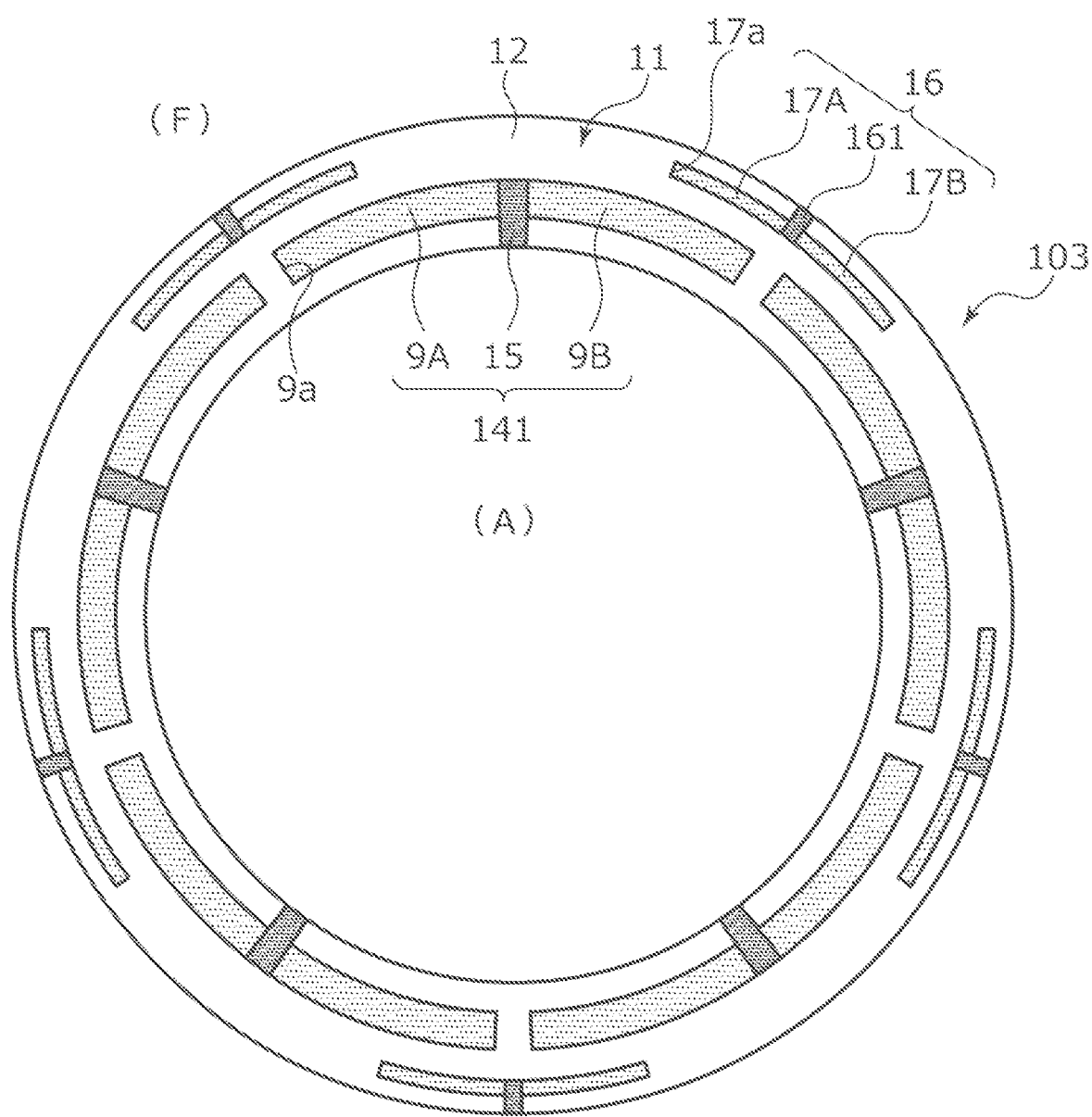
FIG. 9 is a view of a sliding surface of a stationary seal ring of a sliding component according to a fourth embodiment of the present invention when seen in the axial direction.

As illustrated in FIG. 9, a stationary seal ring 103 is provided to be shifted from the dynamic pressure generating mechanism 141 in the circumferential direction such that the specific dynamic pressure generating mechanism 16 is located between the dynamic pressure generating mechanisms 141 adjacent to each other. The specific dynamic pressure generating mechanism 16 overlaps, in the radial direction, the dynamic pressure generating mechanisms 141 adjacent thereto. Accordingly, the sealed liquid F circulates such that the sealed liquid F which has flowed out from an end portion on the downstream side of the Rayleigh step 17A of the specific dynamic pressure generating mechanism 16 is suctioned into the reverse Rayleigh step 9B of the dynamic pressure generating mechanism 141, and the sealed liquid F which has flowed out from the downstream side of the Rayleigh step 9A of the dynamic pressure generating mechanism 141 is suctioned into the reverse Rayleigh step 17B of the specific dynamic pressure generating mechanism 16. Therefore, a liquid film can be stably formed between the sliding surfaces 11 and 21.

In addition, since the wall portion 9a which is an end of the dynamic pressure generating mechanism 141 and a wall portion 17a which is an end of the specific dynamic pressure generating mechanism 16 are shifted from each other in the circumferential direction, the pressure can be distributed with good balance in the circumferential direction of the sliding surfaces 11 and 21. Further, the sealed liquid F which has flowed out from the end portion on the downstream side of the Rayleigh step 17A of the specific dynamic pressure generating mechanism 16 can be efficiently recovered by the liquid guide groove portion 15 of the dynamic pressure generating mechanism 141.

Fifth Embodiment

Next, a sliding component according to a fifth embodiment of the present invention will be described with reference to FIG. 10. Incidentally, the description of configurations which are the same as and duplicated from those in the second embodiment will be omitted.

Figure 10:
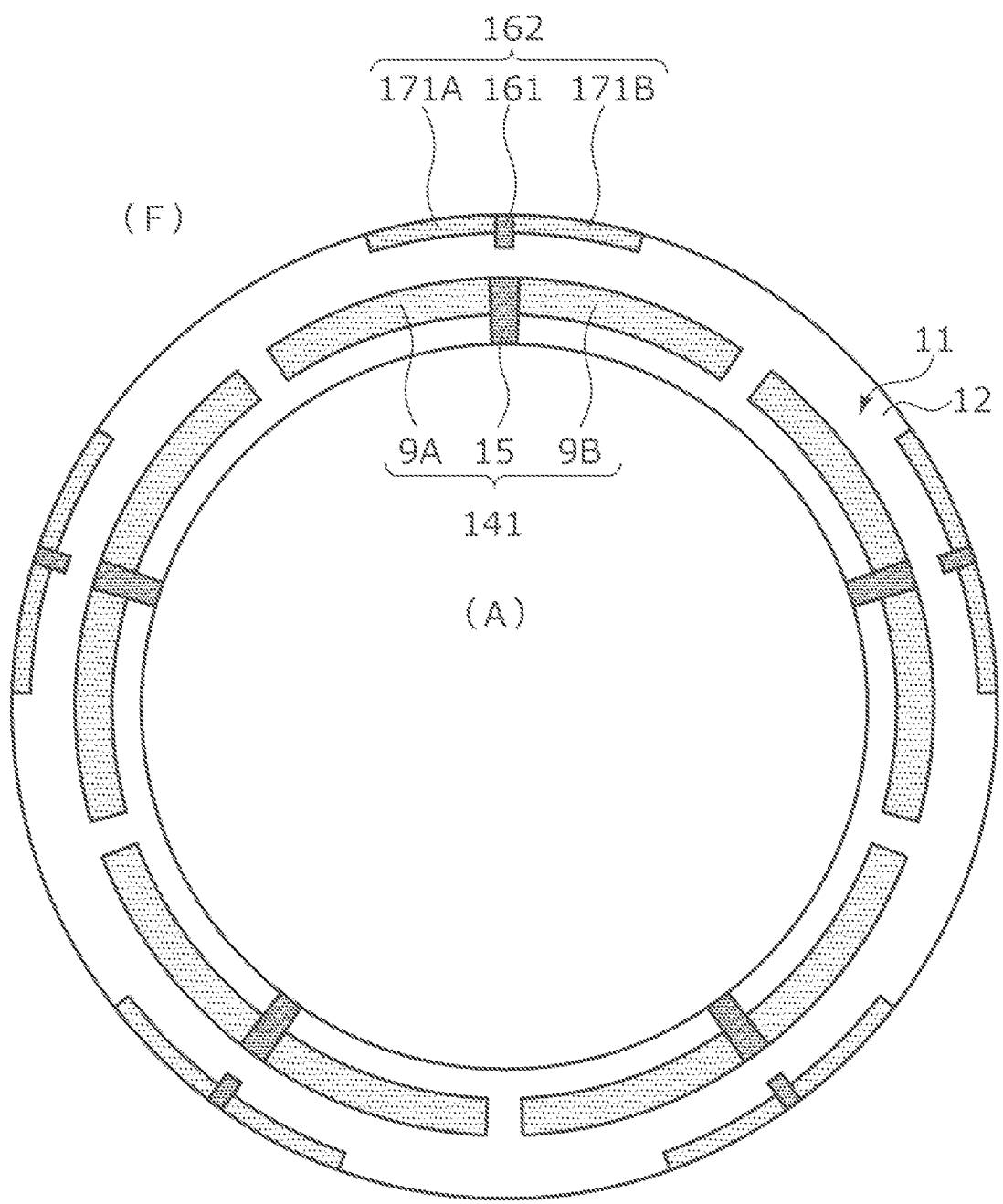
FIG. 10 is a view of a sliding surface of a stationary seal ring of a sliding component according to a fifth embodiment of the present invention when seen in the axial direction.

As illustrated in FIG. 10, in a specific dynamic pressure generating mechanism 162, a Rayleigh step 171A and a reverse Rayleigh step 171B are formed from an outer diameter side end portion of the liquid guide groove portion 161, and the Rayleigh step 171A and the reverse Rayleigh step 171B communicate with the high-pressure side.

Sixth Embodiment

Next, a sliding component according to a sixth embodiment of the present invention will be described with reference to FIG. 11. Incidentally, the description of configurations which are the same as and duplicated from those in the second embodiment will be omitted.

Figure 11:
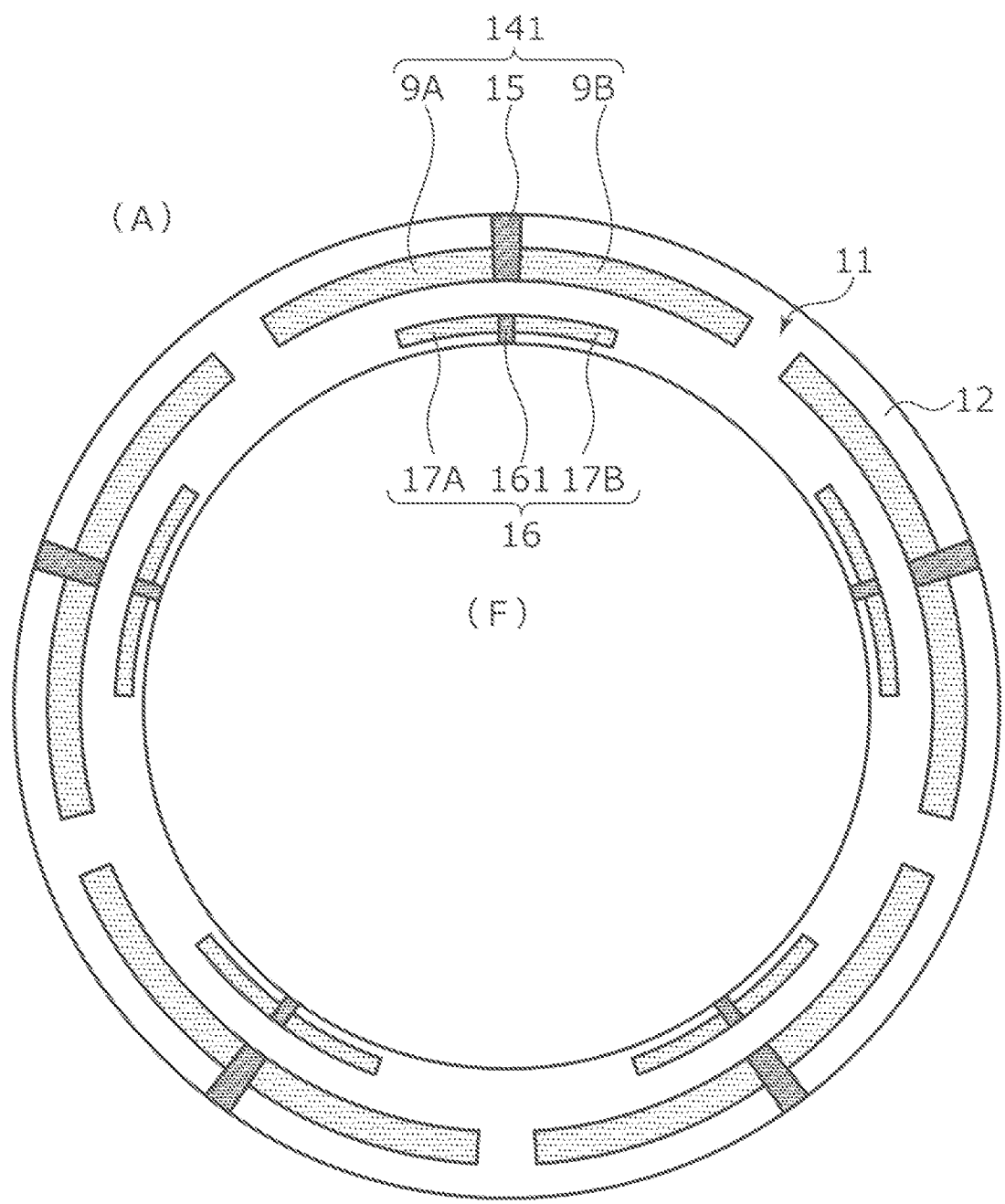
FIG. 11 is a view of a sliding surface of a stationary seal ring of a sliding component according to a sixth embodiment of the present invention when seen in the axial direction.

A mechanical seal illustrated in FIG. 11 is an outside mechanical seal that seals the sealed liquid F which tends to leak from an inner diameter side of sliding surfaces toward an outer diameter side. The dynamic pressure generating mechanism 141 is disposed on the outer diameter side to communicate with a low-pressure side, and the specific dynamic pressure generating mechanism 16 is disposed on the inner diameter side to communicate with a high-pressure side. Incidentally, even in the outside mechanical seal, the dynamic pressure generating mechanism may be formed in an inverted L shape or an L shape corresponding to one rotational direction as in the first embodiment, and modification examples to be described later of the dynamic pressure generating mechanism may be applied. In addition, the specific dynamic pressure generating mechanism may not be provided as in the first embodiment, or the specific dynamic pressure generating mechanism may be formed as illustrated in FIGS. 8 to 10.

Next, modification examples of the dynamic pressure generating mechanisms of the first to fifth embodiments will be described based on FIGS. 12 to 16.

As illustrated in FIG. 12A, in a dynamic pressure generating mechanism 142 of a third modification example, a Rayleigh step 91A and a reverse Rayleigh step 91B extend from a central portion in the radial direction of the liquid guide groove portion 15 in the circumferential direction. Accordingly, the liquid guide groove portion 15 further extends to the outer diameter side than the Rayleigh step 91A and the reverse Rayleigh step 91B. Therefore, the sealed liquid F on the outer diameter side can easily enter the liquid guide groove portion 15, and a large amount of the sealed liquid F can be stored in the liquid guide groove portion 15.

In addition, as illustrated in FIG. 12B, in a dynamic pressure generating mechanism 143 of a fourth modification example, a groove 92 as a shallow groove portion which is shifted to the outer diameter side of the liquid guide groove portion 15 as a deep groove portion to extend in the circumferential direction is formed in an arc shape, and the dynamic pressure generating mechanism 143 has a T shape when seen in the direction orthogonal to the sliding surface 11. Accordingly, the sealed liquid F can be directly supplied from a reverse Rayleigh step which is a portion of the groove 92 upstream of the liquid guide groove portion 15 to a Rayleigh step which is a portion downstream of the liquid guide groove portion 15. Incidentally, the position of the shallow groove portion in the deep groove portion can be freely changed as long as the shallow groove portion and the deep groove portion communicate with each other.

In addition, as illustrated in FIG. 13A, in a liquid guide groove portion 151 of a dynamic pressure generating mechanism 144 of a fifth modification example, the width in the circumferential direction of an outer diameter side end portion 151a communicating with the Rayleigh step 9A and the reverse Rayleigh step 9B is smaller than that of an inner diameter side end portion 151b thereof. Accordingly, the inner diameter side end portion 151b is formed to be wider in the circumferential direction than the outer diameter side end portion 151a. Therefore, the sealed liquid F adhering to a surface closer to the inside than the sliding surface 11 is easily suctioned into the liquid guide groove portion 151.

In addition, as illustrated in FIG. 13B, in a liquid guide groove portion 152 of a dynamic pressure generating mechanism 145 of a sixth modification example, the depth dimension of an inner diameter side end portion 152b is larger than the depth dimension of an outer diameter side end portion 152a. Accordingly, a step is formed in a communication part between the inner diameter side end portion 152b and the outer diameter side end portion 152a. Therefore, the sealed liquid F held in the inner diameter side end portion 152b is unlikely to flow out to the low-pressure side.

In addition, as illustrated in FIG. 14A, a liquid guide groove portion 153 of a dynamic pressure generating mechanism 146 of a seventh modification example includes a first portion 153b that is located closer to the inner diameter side than the Rayleigh step 9A and the reverse Rayleigh step 9B, and a second portion 153a that is formed to be narrower in the circumferential direction than the first portion 153b, and extends to the outer diameter side of the first portion 153b. The Rayleigh step 9A and the reverse Rayleigh step 9B communicate with an outer diameter side end portion of the second portion 153a, and are provided to be separated to the outer diameter side from the first portion 153b.

In addition, as illustrated in FIG. 14B, in a liquid guide groove portion 154 of a dynamic pressure generating mechanism 147 of an eighth modification example, a second portion 154a communicating with the Rayleigh step 9A and the reverse Rayleigh step 9B is formed with a larger width in the circumferential direction than that of a first portion 154b located on the inner diameter side thereof. Incidentally, the first portion 154b, and the Rayleigh step 9A and the reverse Rayleigh step 9B have the same width in the radial direction, and communicate with each other over the entire width. Accordingly, the first portion 154b is narrower in width than the second portion 154a. Therefore, the sealed liquid F held in the second portion 154a on the outer diameter side is unlikely to flow out to the low-pressure side.

In addition, as illustrated in FIG. 15A, in a liquid guide groove portion 155 of a dynamic pressure generating mechanism 148 of a ninth modification example, a portion communicating with the Rayleigh step 9A and the reverse Rayleigh step 9B is tapered toward the outer diameter side. Accordingly, the sealed liquid F can be guided to the outer diameter side of the liquid guide groove portion 155.

In addition, as illustrated in FIG. 15B, in a liquid guide groove portion 156 of a dynamic pressure generating mechanism 149 of a tenth modification example, a portion located closer to the inner diameter side than the Rayleigh step 9A and the reverse Rayleigh step 9B is tapered toward the inner diameter side. Accordingly, the sealed liquid F held in the liquid guide groove portion 156 is unlikely to flow out to the low-pressure side.

In addition, as illustrated in FIG. 16A, in a liquid guide groove portion 157 of a dynamic pressure generating mechanism 241 of an eleventh modification example, a portion located closer to the inner diameter side than the Rayleigh step 9A and the reverse Rayleigh step 9B has an arc shape, and is formed to further bulge in the circumferential direction than a portion communicating with the Rayleigh step 9A and the reverse Rayleigh step 9B. Since a portion on the inner diameter side of the liquid guide groove portion 157 is a curved surface, the sealed liquid F can flow smoothly.

In addition, as illustrated in FIG. 16B, in the stationary seal ring 10 of a twelfth modification example, the dynamic pressure generating mechanisms 14 and dynamic pressure generating mechanisms 242 are alternately provided in the circumferential direction. The dynamic pressure generating mechanism 242 includes a liquid guide groove portion 158, and the reverse Rayleigh step 9B that extends from an outer diameter side end portion of the liquid guide groove portion 158 to the downstream side in the circumferential direction. Namely, the dynamic pressure generating mechanism 242 has an L shape when seen in the direction orthogonal to the sliding surface 11. Accordingly, the above configuration can be used without being limited by the rotational direction of the rotating seal ring 20.

The embodiments of the present invention have been described above with reference to the drawings; however, the specific configuration is not limited to the embodiments, and the present invention also includes changes or additions that are made without departing from the concept of the present invention.

For example, in the embodiments, as an example of the sliding component, the mechanical seal for a general industrial machine has been described, but the present invention may be applied to other mechanical seals for an automobile, a water pump, and the like. In addition, the present invention is not limited to the mechanical seal, and may be applied to a sliding component such as a slide bearing other than the mechanical seal.

In addition, in the embodiments, an example where the dynamic pressure generating mechanism is provided only in the stationary seal ring has been described; however, the dynamic pressure generating mechanism may be provided only in the rotating seal ring 20, or may be provided in both the stationary seal ring and the rotating seal ring.

In addition, in the embodiments, a mode in which the sliding component is provided with the plurality of dynamic pressure generating mechanisms having the same shape has been provided as an example; however, a plurality of dynamic pressure generating mechanisms having different shapes may be provided. In addition, the interval between the dynamic pressure generating mechanism, the number of the dynamic pressure generating mechanisms, or the like can be appropriately changed.

In addition, the description has been given based on the premise that the sealed fluid side is a high-pressure side and the leakage side is a low-pressure side; however, the sealed fluid side may be a low-pressure side and the leakage side may be a high-pressure side, or the sealed fluid side and the leakage side may have substantially the same pressure.

REFERENCE SIGNS LIST

9A Rayleigh step (shallow groove portion)
9B Reverse Rayleigh step (shallow groove portion)
10 Stationary seal ring (sliding component)
11 Sliding surface
14 Dynamic pressure generating mechanism
15 Liquid guide groove portion (deep groove portion)
16 Specific dynamic pressure generating mechanism
17A Rayleigh step (shallow groove portion)
17B Reverse Rayleigh step (shallow groove portion)
18 Step
20 Rotating seal ring (sliding component)
21 Sliding surface
141 Dynamic pressure generating mechanism

The invention claimed is:
1. A mechanical seal comprising a stationary seal ring directly or indirectly fixed to a housing of a rotary machine and a rotating seal ring directly or indirectly fixed to a rotating shaft of the rotary machine, wherein one of an outer diameter side and an inner diameter side of the mechanical seal is a high-pressure side and remaining one of the outer diameter side and the inner diameter side is a low-pressure side, the mechanical seal is configured to prevent a sealed fluid from leaking from the high-pressure side to the low-pressure side by slidably rotating the rotating seal ring with respect to the stationary seal ring, wherein a sliding surface of one of the stationary seal ring and the rotating seal ring is provided with a plurality of dynamic pressure generating mechanisms each of which includes a deep groove portion configured to communicate with the low-pressure side and at least one shallow groove portion configured to communicate with the deep groove portion and extends in a circumferential direction, the shallow groove portion being shallower than the deep groove portion, the dynamic pressure generating mechanisms communicate with only the low-pressure side, the shallow groove portion is isolated from both the low-pressure side and the high pressure side by a land, and a radial length of the land disposed on the low-pressure side in relation to the shallow groove portion is larger than a circumferential length of the deep groove portion.

2. The mechanical seal according to claim 1,
wherein the deep groove portion extends in a radial direction.

3. The mechanical seal according to claim 1,
wherein each of the plurality of dynamic pressure generating mechanisms includes a first shallow groove portion and a second shallow groove portion configured to extend from each of the deep groove portions to both sides in the circumferential direction.

4. The mechanical seal according to claim 3,
wherein the plurality of dynamic pressure generating mechanisms includes a first dynamic pressure generating mechanism and a second dynamic pressure generating mechanism adjacent to each other in the circumferential direction, the first shallow groove portion of the first dynamic pressure generating mechanism is adjacent, in the circumferential direction, to the second shallow groove portion of the second dynamic pressure generating mechanism.

5. The mechanical seal according to claim 1,
wherein the deep groove portion is configured to communicate with an inner diameter side of the sliding component.

6. The mechanical seal according to claim 1,
wherein the sliding surface of the one of the stationary seal ring and the rotating seal ring is provided with a specific dynamic pressure generating mechanism that is disposed on the high-pressure side with respect to the dynamic pressure generating mechanism and is independent of the dynamic pressure generating mechanism.

7. The mechanical seal according to claim 2,
wherein a step in a depth direction is formed in a communication part between the shallow groove portion and the deep groove portion.

8. The mechanical seal according to claim 2,
wherein each of the plurality of dynamic pressure generating mechanisms includes a first shallow groove portion and a second shallow groove portion configured to extend from each of the deep groove portions to both sides in the circumferential direction.

9. The mechanical seal according to claim 8,
wherein the plurality of dynamic pressure generating mechanisms includes a first dynamic pressure generating mechanism and a second dynamic pressure generating mechanism adjacent to each other in the circumferential direction, the first shallow groove portion of the first dynamic pressure generating mechanism is adjacent, in the circumferential direction, to the second shallow groove portion of the second dynamic pressure generating mechanism.

10. The mechanical seal according to claim 2,
wherein the deep groove portion is configured to communicate with an inner diameter side of the sliding component.

11. The mechanical seal according to claim 2,
wherein the sliding surface of the one of the stationary seal ring and the rotating seal ring is provided with a specific dynamic pressure generating mechanism that is disposed on the high-pressure side with respect to the dynamic pressure generating mechanism and is independent of the dynamic pressure generating mechanism.

12. The mechanical seal according to claim 3,
wherein the deep groove portion is configured to communicate with an inner diameter side of the sliding component.

13. The mechanical seal according to claim 3,
wherein the sliding surface of the one of the stationary seal ring and the rotating seal ring is provided with a specific dynamic pressure generating mechanism that is disposed on the high-pressure side with respect to the dynamic pressure generating mechanism and is independent of the dynamic pressure generating mechanism.

14. The mechanical seal according to claim 4,
wherein the deep groove portion is configured to communicate with an inner diameter side of the sliding component.

15. The mechanical seal according to claim 4,
wherein the sliding surface of the one of the stationary seal ring and the rotating seal ring is provided with a specific dynamic pressure generating mechanism that is disposed on the high-pressure side with respect to the dynamic pressure generating mechanism and is independent of the dynamic pressure generating mechanism.

16. A mechanical seal comprising a stationary seal ring directly or indirectly fixed to a housing of a rotary machine and a rotating seal ring directly or indirectly fixed to a rotating shaft of the rotary machine, wherein one of an outer diameter side and an inner diameter side of the mechanical seal is a high-pressure side and remaining one of the outer diameter side and the inner diameter side is a low-pressure side, the mechanical seal is configured to prevent a sealed fluid from leaking from the high-pressure side to the low-pressure side by slidably rotating the rotating seal ring with respect to the stationary seal ring, wherein a sliding surface of one of the stationary seal ring and the rotating seal ring is provided with a plurality of dynamic pressure generating mechanisms each of which includes a deep groove portion configured to communicate with the low-pressure side and at least one shallow groove portion configured to communicate with the deep groove portion and extends in a circumferential direction, the shallow groove portion being shallower than the deep groove portion, the sliding surface of the one of the stationary seal ring and the rotating seal ring is provided with a plurality of specific dynamic pressure generating mechanisms each of which includes a deep groove portion configured to communicate with the high-pressure side, and at least one shallow groove portion configured to communicate with the deep groove portion of each of the specific dynamic pressure generating mechanisms and extends in the circumferential direction, the shallow groove portion of each of the specific dynamic pressure generating mechanisms being shallower than the deep groove portion of each of the specific dynamic pressure generating mechanisms, each of the dynamic pressure generating mechanisms has a volume which is larger than a volume of each of the specific dynamic pressure generating mechanisms, a circumferential length of the deep groove portion of each of the dynamic pressure generating mechanisms is smaller on the low-pressure side than on the high-pressure side, and the deep groove portion of each of the dynamic pressure generating mechanisms and the deep groove portion of each of the specific dynamic pressure generating mechanisms are shifted from each other in a circumferential position.

17. The mechanical seal according to claim 16,
wherein the deep groove portion of each of the dynamic pressure generating mechanisms extends in a radial direction.

18. The mechanical seal according to claim 16,
wherein a step in a depth direction is formed in a communication part between the shallow groove portion and the deep groove portion of each of the dynamic pressure generating mechanisms.

19. The mechanical seal according to claim 16,
wherein each of the plurality of dynamic pressure generating mechanisms includes a first shallow groove portion and a second shallow groove portion configured to extend from each of the deep groove portions to both sides in the circumferential direction.

20. The mechanical seal according to claim 19,
wherein the plurality of dynamic pressure generating mechanisms includes a first dynamic pressure generating mechanism and a second dynamic pressure generating mechanism adjacent to each other in the circumferential direction, the first shallow groove portion of the first dynamic pressure generating mechanism is adjacent, in the circumferential direction, to the second shallow groove portion of the second dynamic pressure generating mechanism.

21. The mechanical seal according to claim 16,
wherein the deep groove portion is configured to communicate with an inner diameter side of the sliding component.

* * * * *